United States Patent
Negri et al.

(10) Patent No.: US 11,934,184 B2
(45) Date of Patent: Mar. 19, 2024

(54) AUTOMATED ANALYSIS OF NON-STATIONARY MACHINE PERFORMANCE

(71) Applicant: AUGURY SYSTEMS LTD., Haifa (IL)

(72) Inventors: Ori Negri, Haifa (IL); Daniel Barsky, Haifa (IL); Gal Ben-Haim, Haifa (IL); Saar Yoskovitz, Haworth, NJ (US); Gal Shaul, Haifa (IL)

(73) Assignee: AUGURY SYSTEMS LTD., Haifa (IL)

( * ) Notice: Subject to any disclaimer, the term of this patent is extended or adjusted under 35 U.S.C. 154(b) by 0 days.

(21) Appl. No.: 18/078,320

(22) Filed: Dec. 9, 2022

(65) Prior Publication Data
US 2023/0114296 A1   Apr. 13, 2023

Related U.S. Application Data

(63) Continuation of application No. 17/291,849, filed as application No. PCT/IL2019/051217 on Nov. 7, 2019, now Pat. No. 11,556,121.
(Continued)

(51) Int. Cl.
*G05B 23/02* (2006.01)
*G01M 13/00* (2019.01)

(52) U.S. Cl.
CPC ......... *G05B 23/0283* (2013.01); *G01M 13/00* (2013.01); *G05B 23/0254* (2013.01)

(58) Field of Classification Search
CPC ............ G05B 23/0283; G05B 23/0254; G05B 23/0221; G05B 19/0428; G05B 23/0281; G05B 23/0286; G01M 13/00; G06N 3/08
(Continued)

(56) References Cited

U.S. PATENT DOCUMENTS 6,199,018 B1   3/2001 Quist et al.
6,539,343 B2 *   3/2003 Zhao ..................... G06F 17/148
                                                                702/190
(Continued)

FOREIGN PATENT DOCUMENTS

CN        105426822 B   *   9/2018   ......... G06K 9/00516
WO        2020/095303 A1       5/2020

OTHER PUBLICATIONS

English translation for CN-105426822-B (Year: 2018).*
(Continued)

*Primary Examiner* — Alesa Allgood
*Assistant Examiner* — Byung Ro Lee
(74) *Attorney, Agent, or Firm* — Sughrue Mion, PLLC

(57) ABSTRACT

A method for machine monitoring including causing a first sensor to acquire at least a first non-stationary signal from at least one machine operating in a non-stationary manner during at least one operational time frame, causing a second sensor to acquire at least a second non-stationary signal from the at least one machine during the operational time frame, fusing a first non-stationary output provided by the first sensor with a second non-stationary output provided by the second sensor, extracting at least one feature from the fused output, analyzing the at least one feature to ascertain a state
(Continued)

of health of the at least one machine and performing at least one operation on the at least one machine based on the state of health as found by the analyzing.

20 Claims, 15 Drawing Sheets

Related U.S. Application Data

(60) Provisional application No. 62/758,054, filed on Nov. 9, 2018.

(58) Field of Classification Search
USPC ............................................. 702/184
See application file for complete search history.

(56) References Cited

U.S. PATENT DOCUMENTS

| | | |
|---|---|---|
| 7,308,322 B1 | 12/2007 | Discenzo et al. |
| 11,556,121 B2 | 1/2023 | Negri et al. |
| 2002/0046006 A1 | 4/2002 | Qian et al. |
| 2005/0096873 A1 | 5/2005 | Klein |
| 2015/0149119 A1 | 5/2015 | Fansler |
| 2018/0005107 A1 | 1/2018 | Neil et al. |
| 2022/0011763 A1 | 1/2022 | Negri et al. |

OTHER PUBLICATIONS

An International Search Report and a Written Opinion both dated Mar. 9, 2020, which issued during the prosecution of Applicant's PCT/IL2019/051217.
An International Preliminary Report on Patentability dated May 11, 2021, which issued during the prosecution of Applicant's PCT/IL2019/051217.
U.S. Appl. No. 62/758,054, filed Nov. 9, 2018.
Jing, Luyang, et al. "An adaptive multi-sensor data fusion method based on deep convolutional neural networks for fault diagnosis of planetary gearbox." Sensors 17.2 (2017): 414.
Williams, Ronald J., and David Zipser. "A learning algorithm for continually running fully recurrent neural networks." Neural computation 1.2 (1989): 270-280.
European Search Report dated Jul. 8, 2022 which issued during the prosecution of Applicant's European App No. 19881982.3.
An Office Action dated Apr. 20, 2022, which issued during the prosecution of U.S. Appl. No. 17/291,849.
Notice of Allowance dated Sep. 21, 2022, which issued during the prosecution of U.S. Appl. No. 17/291,849.
Notice of Allowance dated Sep. 14, 2022, which issued during the prosecution of U.S. Appl. No. 17/291,849.
An Office Action dated Dec. 31, 2022, which issued during the prosecution of Indian Patent Application No. 202117024173.

\* cited by examiner

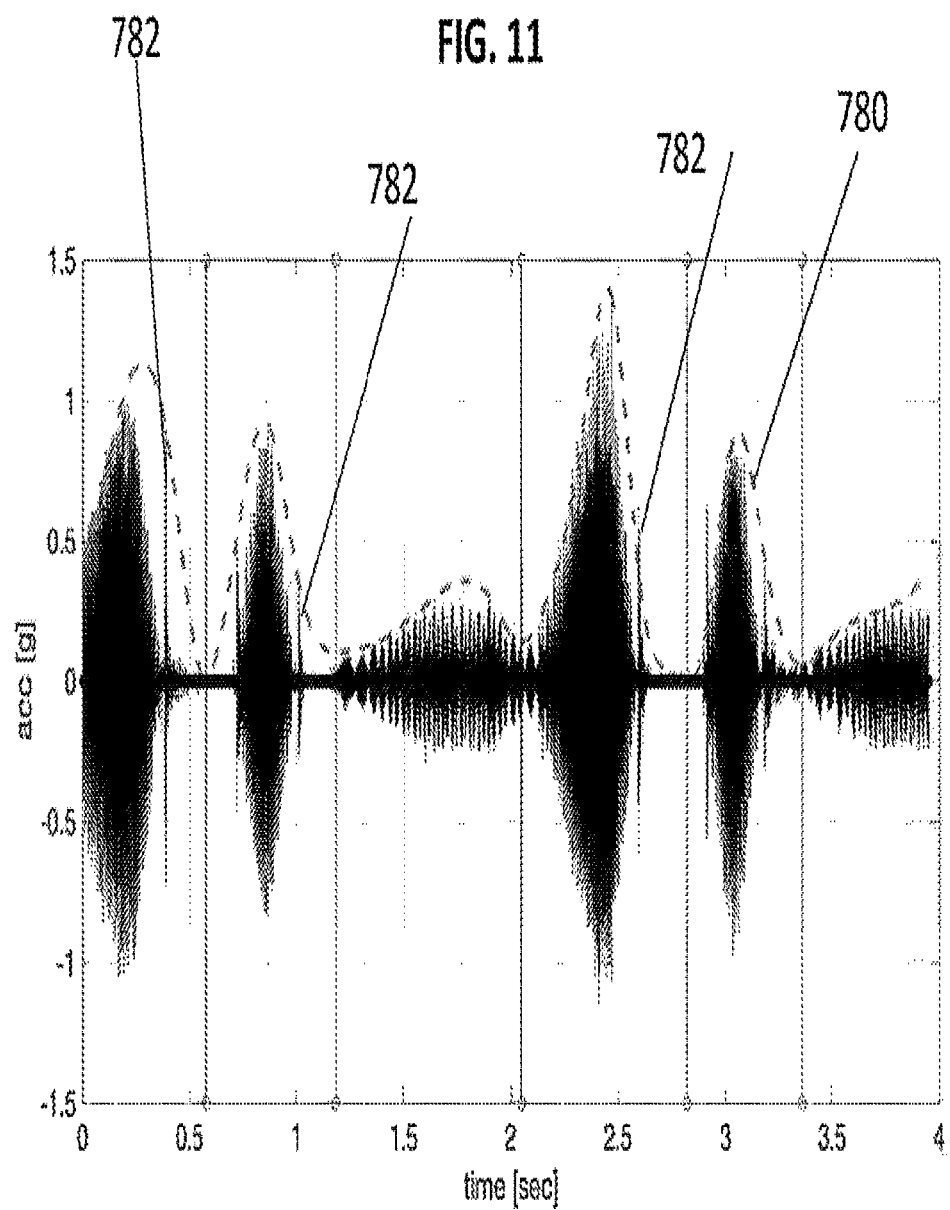

AUTOMATED ANALYSIS OF NON-STATIONARY MACHINE PERFORMANCE

REFERENCE TO RELATED APPLICATIONS

Reference is hereby made to U.S. Provisional Patent Application Ser. No. 62/758,054 filed Nov. 9, 2018 and entitled SYSTEMS AND METHODS FOR AUTOMATED DIAGNOSTICS OF NON-STATIONARY MACHINES, the disclosure of which is hereby incorporated by reference and priority of which is hereby claimed.

FIELD OF THE INVENTION

The present invention relates generally to analysis of machine performance and more particularly to automated analysis of the performance of non-stationary machines.

BACKGROUND OF THE INVENTION

Various types of systems for automated machine analysis are known in the art.

SUMMARY OF THE INVENTION

The present invention seeks to provide novel systems and methods for highly accurate automated analysis of the performance of machines having non-stationary characteristics, thereby enabling preventative maintenance and optimization of operational parameters of such machines.

There is thus provided in accordance with a preferred embodiment of the present invention a method for monitoring at least one machine including causing at least a first sensor to acquire at least a first non-stationary signal from at least one machine operating in a non-stationary manner during at least one operational time frame, the at least first sensor providing at least a first non-stationary output, causing at least a second sensor to acquire at least a second non-stationary signal from the at least one machine during the operational time frame, the at least second sensor providing at least a second non-stationary output, fusing the at least first non-stationary output with the at least second non-stationary output to produce a fused output, extracting at least one feature of at least one of the first and second non-stationary signals based on the fused output, analyzing the at least one feature to ascertain a state of health of the at least one machine and performing at least one of a repair operation, maintenance operation and modification of operating parameters of the at least one machine based on the state of health as found by the analyzing.

In accordance with a preferred embodiment of the present invention, the at least one feature is insensitive to a level of stationarity of the non-stationary operation of the machine.

Preferably, the fusing includes modifying the at least first non-stationary output based on the at least second non-stationary output.

Preferably, the at least first non-stationary signal represents a mechanical state of the machine and the at least second non-stationary signal represents an operational state of the machine.

In accordance with one preferred embodiment of the present invention, the fusing includes applying a wavelet transform to the first and second non-stationary outputs and the modifying includes multiplying the wavelet transform of one of the first and second non-stationary outputs by a binary mask of the wavelet transform of the other one of the first and second non-stationary outputs.

Additionally or alternatively, the fusing employs deep learning.

Preferably, the deep learning includes combining the at least first and second non-stationary outputs into one vector having one or more dimensions and training a neural network to automatically classify the vector.

Preferably, the training of the neural network includes training the neural network to classify the non-stationary outputs based on corresponding stationary outputs from at least one machine sharing at least one common characteristic with the at least one machine being monitored.

Alternatively, the fusing includes combining the at least first and second non-stationary outputs in an interwoven arrangement including alternating ones of the first and second non-stationary outputs and the deep learning includes employing an RNN network for time series prediction.

Preferably, the extracting includes extracting the at least one feature directly from the fused output.

Preferably, the at least one machine includes a group of machines performing a joint process.

There is further provided in accordance with another preferred embodiment of the present invention a method for monitoring at least one machine including causing at least a first sensor to acquire at least a first non-stationary signal from at least one machine operating in a non-stationary manner during at least one operational time frame, the at least first sensor providing at, least a first non-stationary output, causing at least a second sensor to acquire at least a second non-stationary signal from the machine during the time frame, the at least second sensor providing at least a second non-stationary output, modifying the at least first non-stationary output based on the at least second non-stationary output to extract at least one feature of the first non-stationary output, analyzing the at least one feature to ascertain a state of health of the machine and performing at least one of a repair operation, maintenance operation and modification of operating parameters of the machine based on the state of health as found by the analyzing.

In accordance with a preferred embodiment of the present invention, the at least one feature is insensitive to a level of stationarity of the non-stationary operation of the machine.

Preferably, the at least first non-stationary signal represents a mechanical state of the machine and the at least second non-stationary signal represents an operational state of the machine.

Preferably, the modifying includes multiplying a wavelet transform of one of the first and second non-stationary outputs by a binary mask of a wavelet transform of the other one of the first and second non-stationary outputs.

Additionally or alternatively, the modifying and the analyzing employ deep learning.

Preferably, the deep learning includes combining the at least first and second non-stationary outputs into one vector having one or more dimensions and training a neural network to automatically classify the vector.

Preferably, the training of the neural network includes training the neural network to classify the non-stationary outputs based on corresponding stationary outputs from at least one machine sharing at least one common characteristic with the at least one machine being monitored.

Alternatively, the modifying and the analyzing include combining the at least first and second non-stationary outputs in an interwoven arrangement including alternating ones of the first and second non-stationary outputs and employing an RNN network for time series prediction.

Preferably, the at least one machine includes a group of machines performing a joint process.

There is further provided in accordance with a further preferred embodiment of the present invention a system for monitoring at least one machine including a first sensor operative to acquire at least a first non-stationary signal from at least one machine operating in a non-stationary manner during at least one operational time frame, the at least first sensor providing at least a first non-stationary output, a second sensor operative to acquire at least a second non-stationary signal from the at least one machine during the operational time frame, the at least second sensor providing at least a second non-stationary output, a signal processor operative to fuse the at least first non-stationary output with the at least second non-stationary output to produce a fused output, a feature extractor operative to extract at least one feature of at least one of the first and second non-stationary signals based on the fused output and to analyze the at least one feature to ascertain a state of health of the at least one machine and a machine control module operative to control the performance of at least one of a repair operation, maintenance operation and modification of operating parameters of the at least one machine based on the state of health.

In accordance with a preferred embodiment of the present invention, the at least one feature is insensitive to a level of stationarity of the non-stationary operation of the machine.

Preferably, the signal processor is operative to modify the at least first non-stationary output based on the at least second non-stationary output.

Preferably, the at least first non-stationary signal represents a mechanical state of the machine and the at least second non-stationary signal represents an operational state of the machine.

Preferably, the signal processor is operative to apply a wavelet transform to the first and second non-stationary outputs and to multiply the wavelet transform of one of the first and second non-stationary outputs by a binary mask of the wavelet transform of the other one of the first and second non-stationary outputs.

Additionally or alternatively, the signal processor is operative to employ deep learning.

Preferably, the deep learning includes combining the at least first and second non-stationary outputs into one vector having one or more dimensions and training a neural network to automatically classify the vector.

Preferably, the training of the neural network includes training the neural network to classify the non-stationary outputs based on corresponding stationary outputs from at least one machine sharing at least one common characteristic with the at least one machine being monitored.

Alternatively, the signal processor is operative to combine the at least first and second non-stationary outputs in an interwoven arrangement including alternating ones of the first and second non-stationary outputs and the deep learning includes employing an RNN network for time series prediction based on the interwoven arrangement.

Preferably, the at least one feature is directly extracted from the fused output.

Preferably, the at least one machine includes a group of machines operative to perform a joint process.

There is also provided in accordance with a still further preferred embodiment of the present invention a system for monitoring at least one machine including a first sensor operative to acquire at least a first non-stationary signal from at least one machine operating in a non-stationary manner during at least one operational time frame, the at least first sensor providing at least a first non-stationary output, a second sensor operative to acquire at least a second non-stationary signal from the machine during the time frame, the at least second sensor providing at least a second non-stationary output; a signal processor operative to modify the at least first non-stationary output based on the at least second non-stationary output, to extract at least one feature of the modified first non-stationary output and to analyze the at least one feature to ascertain a state of health of the machine and a control module operative to control the performance of at least one of a repair operation, maintenance operation and modification of operating parameters of the machine based on the state of health.

In accordance with a preferred embodiment of the present invention, the at least one feature is insensitive to a level of stationarity of the non-stationary operation of the machine.

Preferably, the at least first non-stationary signal represents a mechanical state of the machine and the at least second non-stationary signal represents an operational state of the machine.

Preferably, the signal processor is operative to multiply a wavelet transform of one of the first and second non-stationary outputs by a binary mask of a wavelet transform of the other one of the first and second non-stationary outputs.

Additionally or alternatively, the signal processor employs deep learning.

Preferably, the deep learning includes combining the at least first and second non-stationary outputs into one vector having one or more dimensions and training a neural network to automatically classify the vector.

Preferably, the training of the neural network includes training the neural network to classify the non-stationary outputs based on corresponding stationary outputs from at least one machine sharing at least one common characteristic with the at least one machine being monitored.

Alternatively, the signal processor is operative to combine the at least first and second non-stationary outputs in an interwoven arrangement including alternating ones of the first and second non-stationary outputs and to employ an RNN network for time series prediction based on the interwoven arrangement.

Preferably, the at least one machine includes a group of machines performing a joint process.

BRIEF DESCRIPTION OF THE DRAWINGS

The present invention will be understood and appreciated more fully from the following detailed description, taken in conjunction with the drawings in which:

FIGS. 8, 9, 10 and 11 are respective graphs showing features of signals arising from a non-stationary machine operating in a system of the type shown in FIG. 7;

DETAILED DESCRIPTION OF PREFERRED EMBODIMENTS

Figure 1:
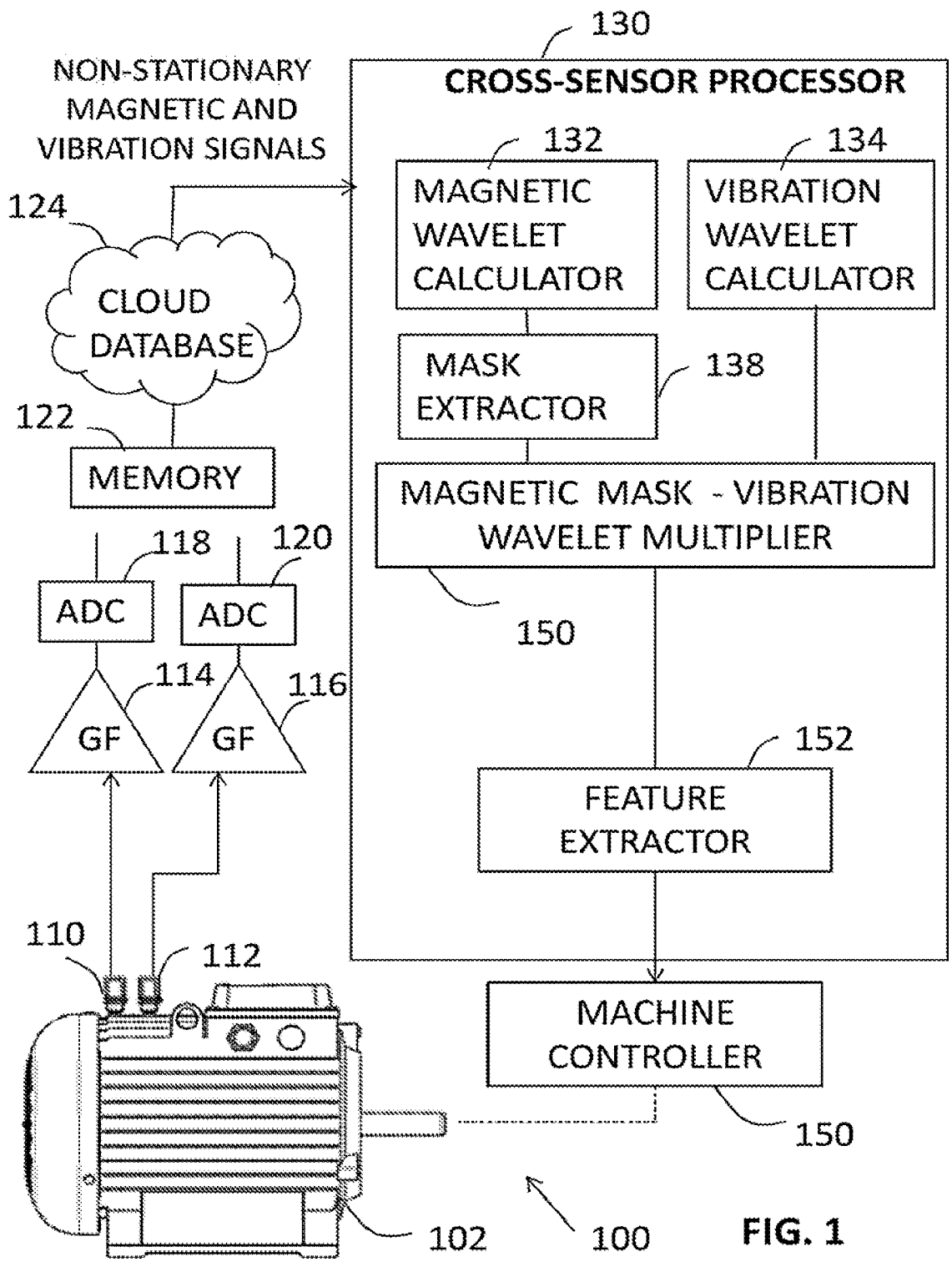
FIG. 1 is a simplified partially pictorial, partially block-diagram illustration of a system for automated analysis of non-stationary machine performance, constructed and operative in accordance with a preferred embodiment of the present invention.

Reference is now made to FIG. 1, which is a simplified partially pictorial, partially block-diagram illustration of a system for automated analysis of non-stationary machine performance, constructed and operative in accordance with a preferred embodiment of the present invention.

As seen in FIG. 1, there is provided a system 100 for monitoring and automated analysis of the performance of a non-stationary machine, here embodied, by way of example only, as a motor 102 operating in a non-stationary manner. Motor 102 is preferably a non-stationary machine generating non-stationary signals during the operation thereof. As used herein, the term non-stationary machine refers to a machine performing a process having at least one characteristic that changes over time, thus giving rise to a non-stationary signal during the operation thereof. Such non-stationary machines may include machines driven by a time varying input, such as, by way of example, a servo motor controlled by a driver modifying the frequency and magnitude of the input power over time; motors driving moving equipment such as elevators and cranes which provide a varying driving power over time; machines experiencing a time varying load at the output thereof such as CNC process machines subject to load variations and friction changes during the operation thereof and machines mounted on a moving base such as, by way of example, motors installed on manufacturing robots.

It is appreciated that conventional machine monitoring and diagnostic techniques are poorly suited for the monitoring and analysis of such non-stationary machines, due to the non-stationary signal characteristics exhibited thereby. By way of example, conventional machine diagnostics based on spectral analysis of vibration signals generated during machine operation are not suitable for analyzing non-stationary signals due to the time variation of the spectral content of the non-stationary signals resulting from variation in operating parameters such as speed and load. By way of example, in the case of motor 102, motor 102 may exhibit a non-stationary time varying RPM speed and harmonics thereof. The vibration amplitude of the RPM frequency and its harmonics, which parameter is typically correlated with machine condition and machine faults, will therefore exhibit time variations and thus cannot be accurately extracted based on conventional spectral analysis of the sampled signal. Further by way of example, motor 102 may exhibit non-stationary time varying bearing frequencies or line frequencies. The vibration amplitude of these frequencies, which are typically correlated with machine condition and machine faults, will therefore exhibit time variations and thus cannot be accurately extracted based on conventional spectral analysis of the sampled signal.

In accordance with preferred embodiments of the present invention, novel systems and methods are provided for the monitoring and automated condition analysis of non-stationary machines, based on monitoring of the non-stationary machines during at least one operational time frame by a plurality of sensors and fusing the respective non-stationary outputs of the plurality of sensors into a fused or combined output. Particularly preferably, the fusing includes modifying the non-stationary signal measured and output by at least one of the sensors by the non-stationary signal measured and output at least another one of the sensors. Such modifying may be used to extract signal features which may be accurately analyzed by conventional signal analysis approaches suited for the analysis of stationary signals, without loss of accuracy. Analysis of the signal features may yield the present state of health of the machine, which state of health may include information relating to the machine performance, machine efficiency, developing faults and prediction of future performance of the machine. Additionally or alternatively, such methods may be applied to other types of analysis.

As seen in FIG. 1, non-stationary machine 102 is preferably monitored by a plurality of sensors here embodied, by way of example, as a first vibration sensor 110 measuring vibrations arising from machine 102 and a second magnetic sensor 112 measuring magnetic flux arising from machine 102. It is appreciated that the vibration and magnetic flux signals and arising from machine 102 and measurable by first and second sensors 110 and 112 are preferably non-stationary signals due to the inherent non-stationary manner of operation of machine 102, irrespective of the state of health of machine 102.

It is appreciated that vibration and magnetic sensors 110 and 112 are shown by way of example only, and that additional or alternative sensor types may be used to monitor signals emanating from machine 102, including but not limited current sensors, electromagnetic sensors, acoustic sensors, temperature sensors, pressure sensors and fluid flow sensors. It is further appreciated that the plurality of sensors monitoring machine 102 may include a plurality of sensors measuring the same type of signal, such as a plurality of vibration sensors or a plurality of magnetic sensors, wherein the sensors differ from each other and/or are mounted at different locations with respect to machine 102, thus giving rise to slightly different outputs despite measuring the same type of signal emanating from machine 102.

It is additionally appreciated that the plurality of sensors by which machine 102 is monitored may be contact or non-contact sensors. In certain embodiments of the present invention, the use of non-contact sensors may be preferable due to the difficulty in securely attaching sensors to moving non-stationary equipment.

Plurality of sensors, such as sensors 110 and 112, preferably monitor machine 102 during the same at least one operational time frame of machine 102, such that the respective non-stationary outputs of the sensors represent the same period or periods of machine operation. In one preferred embodiment of the present invention, the plurality of sensors, such as sensors 110 and 112 monitoring machine 102, are sampled mutually synchronously. The sampling may be synchronous within a time window dt of the order of dt≈0.01/f; where f is the frequency of interest, such as the RPM frequency. In another preferred embodiment of the present invention, the plurality of sensors, such as sensors 110 and 112 monitoring machine 102, are sampled mutually synchronously within a time window dt of the order of dt≈0.01/f, where f is the sensor sampling frequency. By way of example, sensors 110 and 112 may operate with a sampling frequency of 20 kHz and thus the time frame dt within which the sensors are synchronously sampled is given by 0.5 μs. It is appreciated that the value of 0.01 is chosen here to limit the error in the synchronous sampling to 1%. However, other values may be selected depending on the required error limits.

Preferably, the first non-stationary output provided by vibration sensor 110 and the second non-stationary output provided by magnetic sensor 112 are provided to respect gain filters (GFs) 114 and 116, which in turn provide the respective signals to analogue-to-digital converters (ADC) 118 and 120. The digitized signals output by ADCs 118 and 120 are preferably provided to a memory component 122 such as a CPU and optionally to a cloud database 124. It is understood that the synchronously sampled data acquired by sensors 110 and 112 may be transferred to an entirely cloud based system, to a local hardware system or to a system comprising both local and cloud based elements, depending on the operating specifications of system 100. It is further understood that the specific processing components shown herein, including GFs 114 and 116, ADCs 118 and 120 and CPU 122, are detailed by way of example only and that any suitable signal processing components may be employed in systems of the present invention.

The preferably synchronously sampled first and second non-stationary outputs respectively output by vibration sensor 110 and magnetic sensor 112 are preferably provided to a cross-sensor signal processor 130, which signal processor 130 may be included in cloud database 124 or may comprise local processing elements.

Preferably, signal processor 130 is operative to receive the first and second non-stationary outputs provided by the at least first and second sensors, here embodied as vibration sensor 110 and vibration sensor 112, and to combine the outputs by modifying the first non-stationary output, for example the output from vibration sensor 110, based at least on the second non-stationary output, for example the output from magnetic sensor 112, in order to extract at least one feature of the first non-stationary output, in this case the vibration output.

Signal processor 130 preferably operates in an automated manner, in one preferred embodiment of the invention, shown in FIG. 1, signal processor 130 may automatically perform a wavelet analysis on the non-stationary magnetic and vibration data in order to extract features thereof, in another preferred embodiment of the invention, shown in FIGS. 4 and 5 and described herein below, signal processor may employ deep learning in order to extract features of the non-stationary signals input thereto.

Signal processor 130 may include a magnetic wavelet calculator 132 and a vibration wavelet calculator 134. Magnetic wavelet calculator 132 preferably applies a wavelet transform to the non-stationary magnetic data from magnetic sensor 112 in order to extract features of the magnetic data. Vibration wavelet calculator 134 preferably applies a wavelet transform to the non-stationary vibration data from, vibration sensor 110 in order to extract features of the vibration data. The wavelet transform of the magnetic and vibration data yields the time dependence of the respective magnetic and vibrational spectral content, thereby avoiding the limitations involved in spectral analysis as a result of the non-stationary nature of the signals generated by machine 102. It is appreciated that the magnetic and vibration wavelet calculation performed by magnetic wavelet calculator 132 and vibration wavelet calculator 134 is a particularly preferred example of an operation for the extraction of features from the non-stationary data acquired by sensors 110 and 112. However, it is understood that alternative data operations in order to extract features of the non-stationary data acquired by sensors 110 and 112 may be implemented.

Figure 2A:
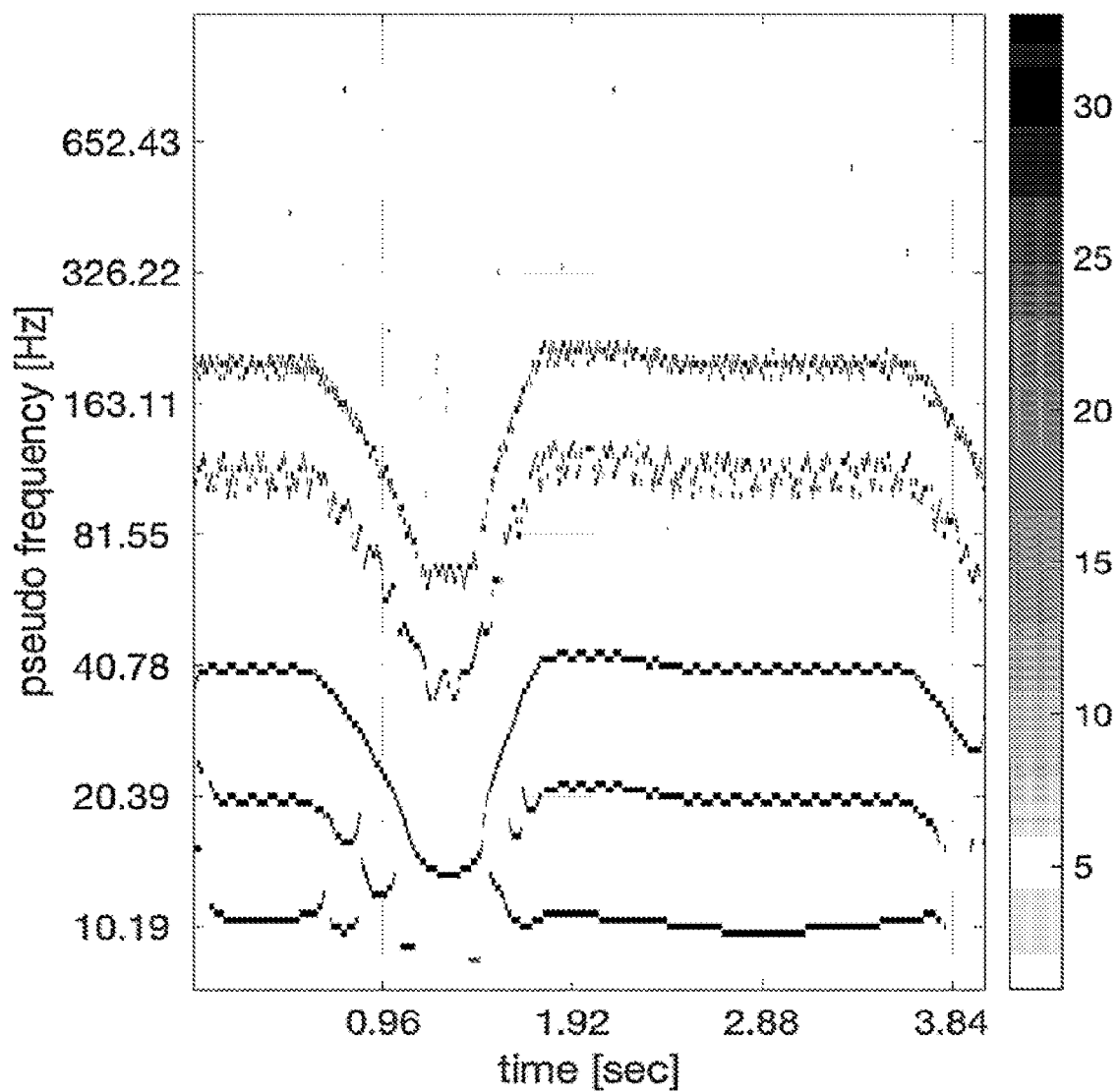
FIGS. 2A, 2B and 3 are respective graphs showing features of signals emanating from a non-stationary machine operating within a system of the type shown in FIG. 1.

A simplified example of a noise-filtered magnetic wavelet image, such as may be output by magnetic wavelet calculator 132, is shown in FIG. 2A. It is appreciated that in FIG. 2A the magnetic wavelet scale is calibrated and is plotted with reference to pseudo-frequencies. Signal magnitude in FIG. 2A is shown with respect to a normalised arbitrary unit scale for clarity of display.

Figure 2B:
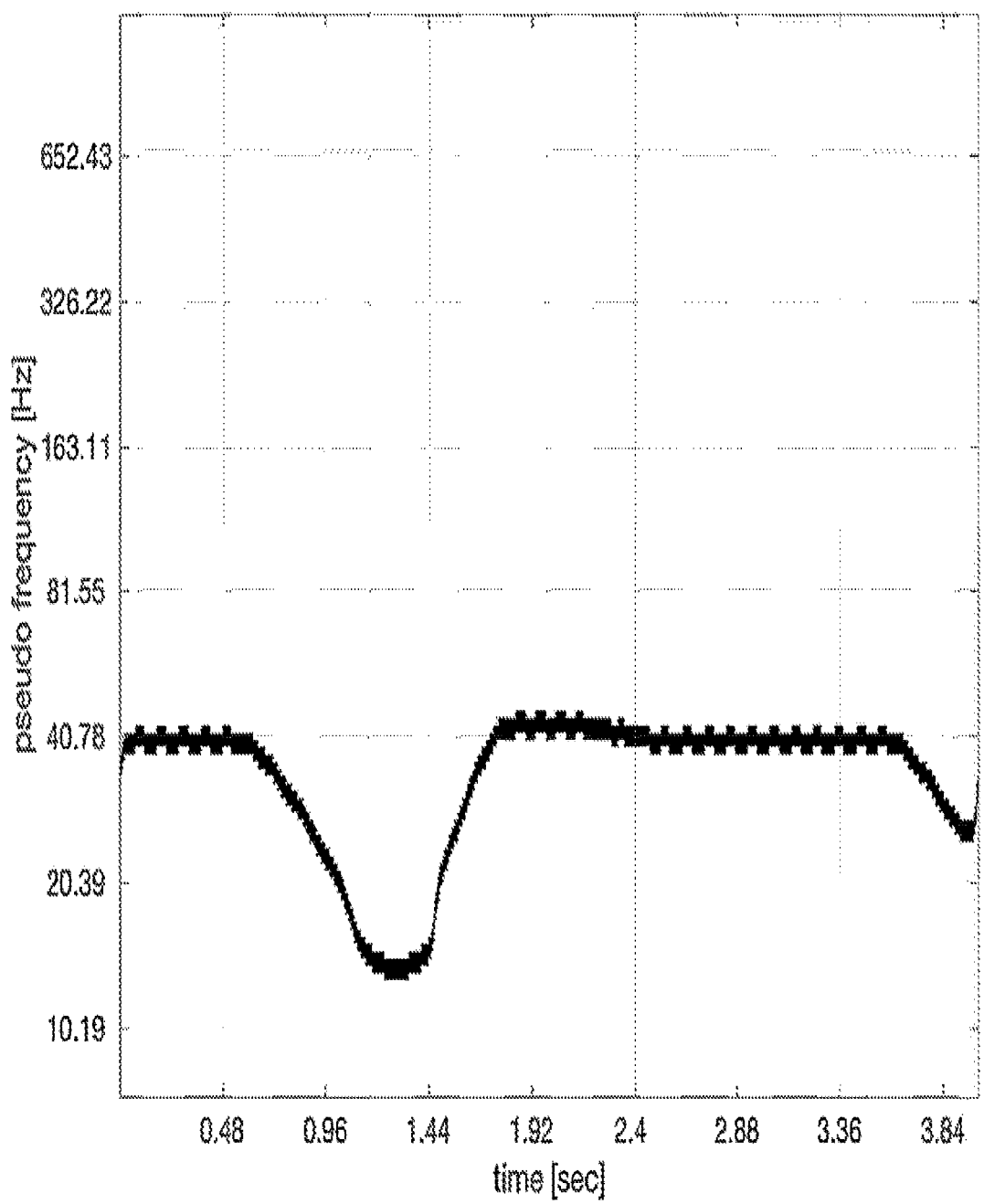

The magnetic wavelet output by the magnetic wavelet calculator 132 is preferably provided to a mask extractor 138. Mask extractor 138 preferably employs image processing algorithms in order to extract a magnetic wavelet mask based on the full magnetic wavelet image but comprising only the time dependence of certain frequencies, with all other frequencies filtered out. By way of example, the magnetic wavelet mask extracted by mask extractor 138 may contain only the time dependence of the RPM frequencies, with all other frequencies filtered out. The magnetic wavelet mask extracted by mask extractor 138 is preferably a binary wavelet matrix, in which the RPM scales may be converted to pseudo-frequencies. Exemplary preferred algorithms that may be used in order to create such a wavelet mask are described in WO2018/198111, assigned to the same assignee as the present invention and incorporated herein by reference. A simplified example of a binary magnetic wavelet mask containing only RPM frequencies extracted from the full magnetic wavelet of FIG. 2A, such as may be output by mask extractor 138, is illustrated in FIG. 2B.

Further by way of example, the magnetic wavelet masked extracted by mask extractor 138 main contain only the time dependence of the RPM frequency and line frequency and the harmonics thereof. These frequencies may correspond to various machine faults, such as mechanical looseness and unbalancing in the case of RPM frequencies and the harmonics thereof and electrical faults in the case of line frequencies and the harmonics thereof.

Figure 3:
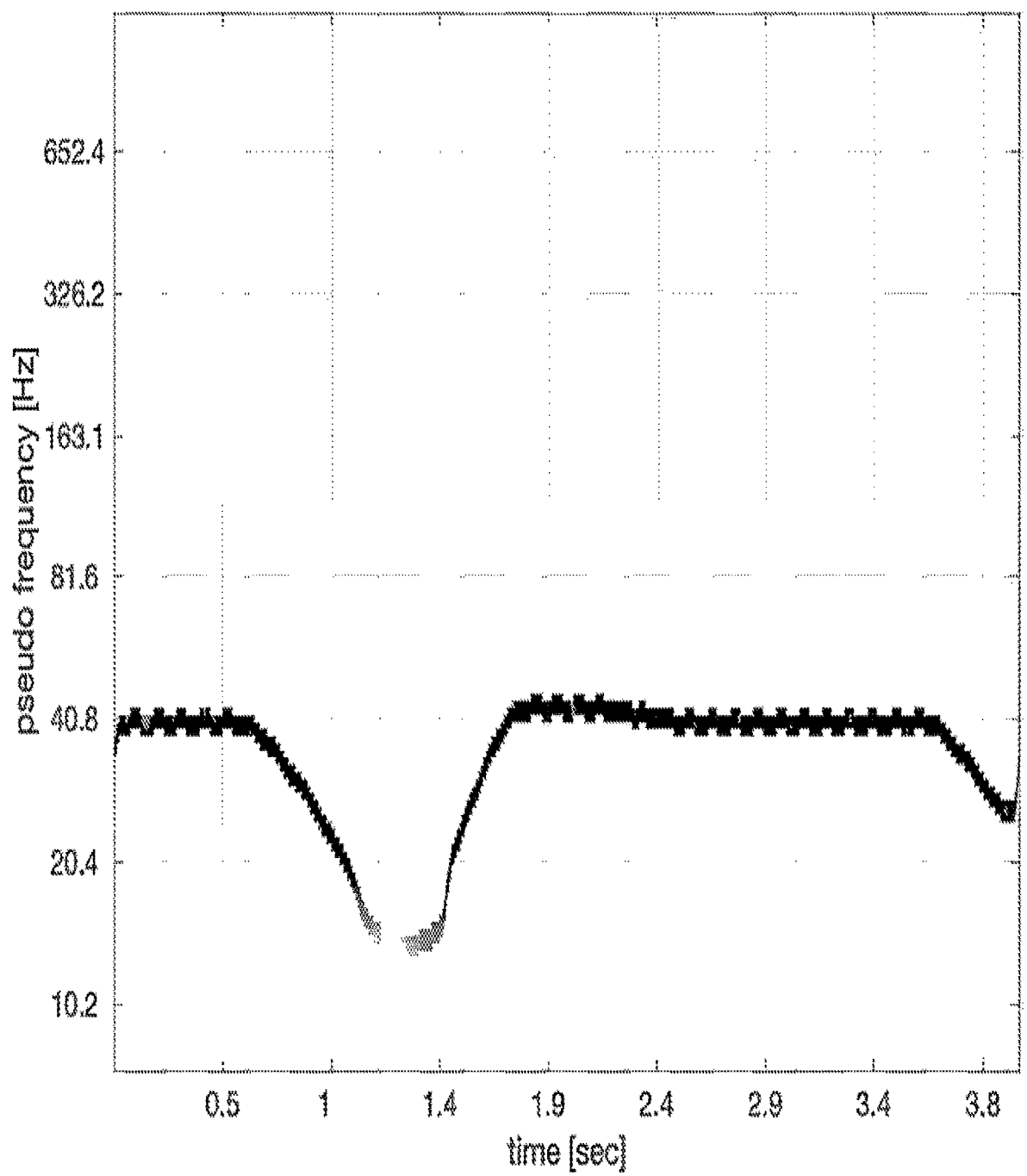

The binary magnetic wavelet mask provided by mask extractor 138 and the full vibration wavelet provided by vibration wavelet calculator 134 are preferably provided to a wavelet multiplier 150. Wavelet multiplier 150 is preferably operative to multiply the binary magnetic wavelet mask by the full vibration wavelet image containing all frequencies and amplitudes. The multiplication of the full vibration wavelet by the magnetic wavelet mask serves to filter out those frequencies from the full vibration wavelet which are not related to the frequency of the mask. For example, in the case that the magnetic wavelet mask contains only RPM frequencies, multiplication of the binary magnetic wavelet mask by the full vibration wavelet yields a vibration wavelet image containing only RPM frequencies. A simplified example of a vibration wavelet image containing only RPM frequencies, such as may be generated by wavelet multiplier 150, is illustrated in FIG. 3.

Further by way of example, in the case that the magnetic wavelet mask is generated based on RPM and line frequencies and the harmonics thereof, the mask may be multiplied by the full vibration wavelet. In this case, the mask may be applied to the full vibration wavelet as an inverse mask, such that only frequencies other than those obtained by multiplying the RPM frequencies and line frequencies and the harmonics thereof by the full vibration wavelet are retained. These frequencies may be termed the non-synchronous frequencies and are closely correlated with bearing frequencies or frequencies associated with other machine components.

A numerical summation may then be performed on the vibration wavelet image containing only RPM frequencies in order to extract the RPM magnitude of the vibration signal, in accordance with $$A_{vib}(\text{RPM}) = \Sigma M_{mag}{}^w(f_{rpm},t) \cdot V_{vib}{}^w(f,t) \quad (1)$$

wherein M is the binary magnetic wavelet matrix in which the RPM frequencies are set to one and all other frequencies are set to zero, as output by mask extractor 138 and V is the total wavelet transform of the vibration signal, as output by vibration wavelet calculator 134. The summation represented in equation (1) may be performed by a feature extractor 152. The product A of equation (1) represents the vibration amplitude of the RPM frequency. This parameter, as explained hereinabove, is highly correlated with machine condition and faults. It is appreciated that feature extractor 152 may be operative to extract any relevant feature from the Filtered vibration wavelet image, including the vibration amplitude of the line frequency or harmonics thereof. The vibration amplitude of the RPM frequency, as output by feature extractor 152, may be analyzed in order to ascertain a state of health of machine 102. The results of such analysis may be provided to a controller 154, based on which controller 154 may automatically modify an operating parameter of machine 102, initiate or schedule a repair operation on machine 102 or initiate or schedule a maintenance operation on machine 102. Additionally or alternatively, the results of such an analysis may be presented in a human-sensible form to at least one human expert, based on which the human expert may evaluate the machine state and initiate maintenance, repair or operational parameter changes accordingly. Additionally or alternatively, the features extracted may be tracked over time, for example by feature tracking algorithms.

It is appreciated that the various operations of signal processor 130 described herein represent a particularly preferred embodiment of computational operations whereby a first non-stationary signal is modified based on a second non-stationary signal in order to extract at least one feature of the first non-stationary output. Here, by way of example, the full vibration wavelet derived from the first non-stationary vibration signal is modified by the RPM binary mask derived from the second non-stationary magnetic signal, in order to extract the RPM magnitude of the first vibration signal, which RPM magnitude may be analyzed in order to find the machine state.

It is further appreciated that the modification of the non-stationary vibration signal by features extracted from the non-stationary magnetic signal in order to derive features of the vibration signal differs fundamentally from a simple comparative analysis of data acquired from the vibration and magnetic sensors 110 and 112. In accordance with preferred embodiments of the present invention, features of data from one type of sensor, such as magnetic sensor 112, are used as a calibration input for data from another type of sensor, such as vibration sensor 110. This cross-sensor calibration is based on the understanding that although the various types of signals, such as vibration and magnetic, are not themselves stationary the relationship between the signals is, such that features from one type of signal may be used to calibrate another type of signal.

It is understood that the present invention is not limited to application to the use of wavelet transforms with respect to a particular frequency, such as the RPM frequency, but rather may be applied to other operations with respect to any relevant portion of the non-stationary signal spectral content. Furthermore, it is understood that although in the example described with respect to FIG. 1 the first signal, by way of example being a vibration signal, is modified based on features extracted from the second signal, by way of example being a magnetic signal, the inverse is also possible, whereby the second signal, by way of example being a magnetic signal, may be modified based on features extracted from the first signal, by way of example being a vibration signal.

It is additionally understood that the various automated signal processing components of signal processor 130, including magnetic wavelet calculator 132, vibration wavelet calculator 134, mask extractor 138, wavelet multiplier 150 and feature extractor 152, are represented herein as individual components for the purpose of ease of explanation of the respective functions thereof. However, the various functions carried out by components of signal processor 130 are not necessarily performed in the order described herein, nor are necessarily sub divided into individual separate modules as illustrated herein.

Figure 4:
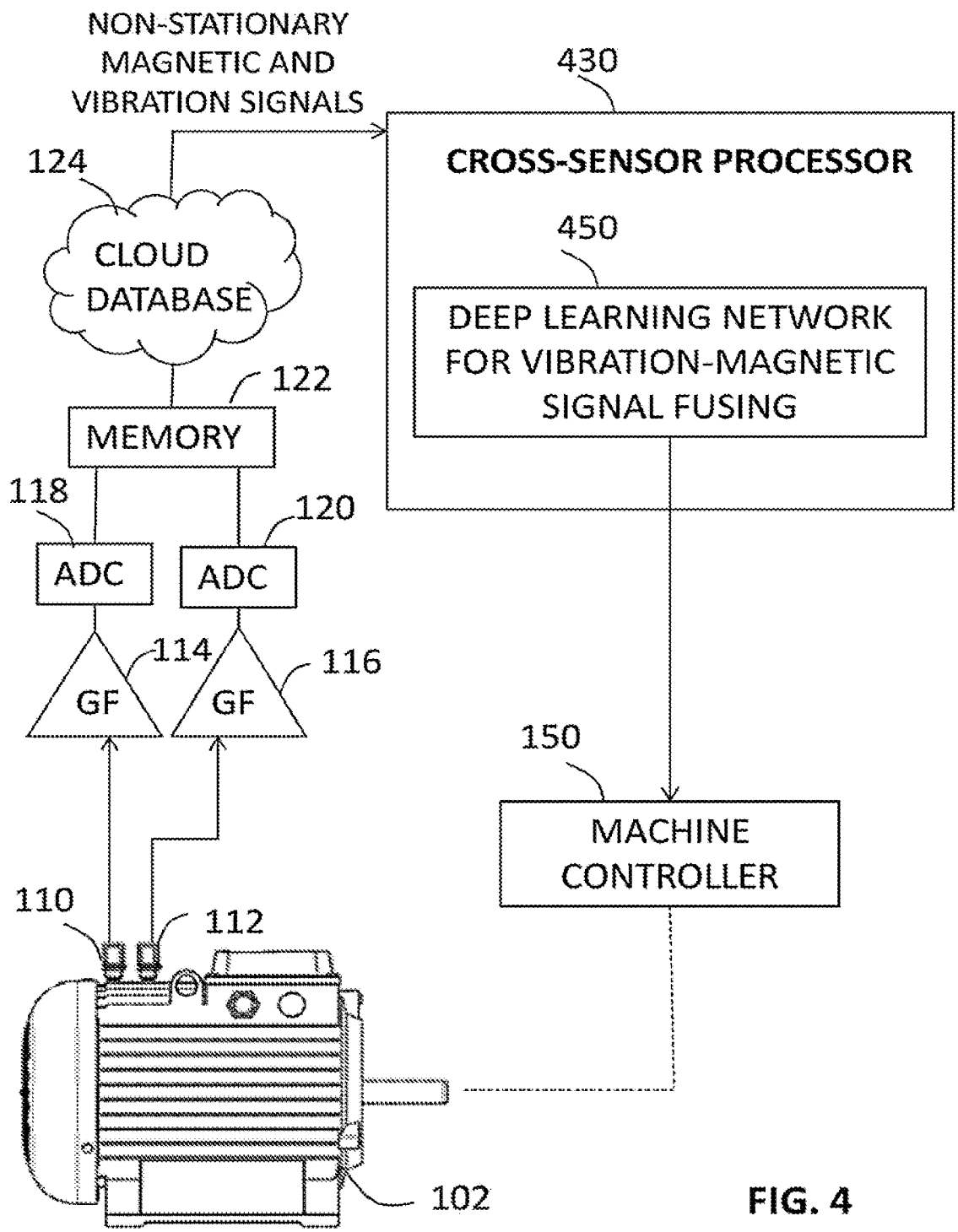
FIG. 4 is a simplified partially pictorial, partially block-diagram illustration of a system for automated analysis of non-stationary machine performance, constructed and operative in accordance with another preferred embodiment of the present invention.

An alternative embodiment of signal processor 130 is shown in FIG. 4. As seen in FIG. 4, signal processor 130 may be replaced by a signal processor 430 including a vibration-magnetic signal fuser 450 operating based on machine learning. Vibration-magnetic signal fuser 450 is preferably operative to employ machine learning to automatically fuse the non-stationary outputs of vibration and magnetic sensors 110 and 112, for example by modifying at least a first non-stationary output such as the non-stationary vibration signal output by vibration sensor 110 based on at least a second non-stationary output, such as the non-stationary magnetic signal output by magnetic sensor 112, so as to extract at least one feature of the first non-stationary output which is insensitive to a level of stationarity of non-stationary operation of machine 102. The at least one feature extracted by vibration-magnetic signal fuser 450 may then be analyzed by conventional signal analysis techniques, which conventional signal analysis techniques are suited for the analysis of features of stationary signals, in order to yield the condition of machine 102 and detect anomalies in the operation thereof. It is appreciated that the non-stationary signals emanating from machine 102 thus may advantageously be analyzed and the condition of machine 102 accurately found based on standard signal analysis techniques, notwithstanding the non-stationary manner of operation of machine 102, due to the extraction of at least one feature of the non-stationary output which is insensitive to the level of stationarity of operation of machine 102.

Figure 5A:
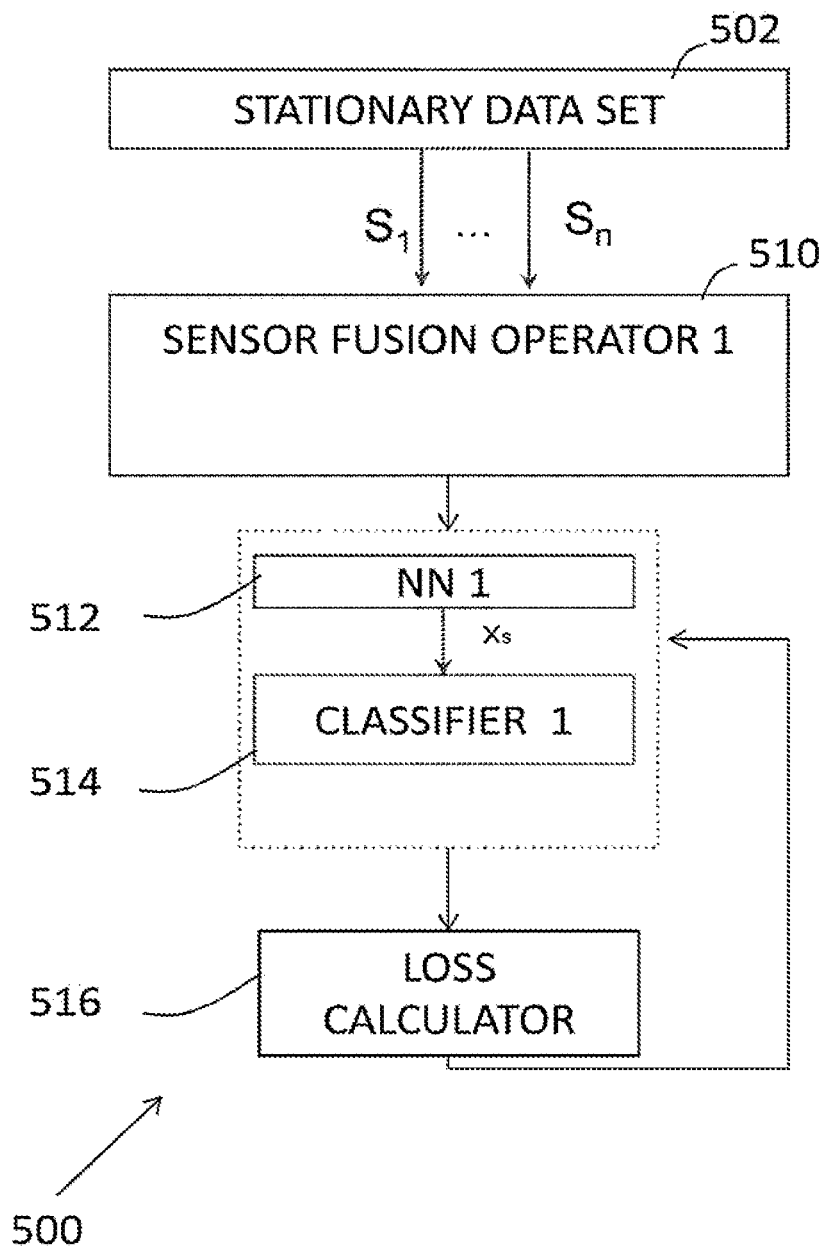
FIGS. 5A, 5B and 5C are simplified charts respectively illustrating steps in the training and operation of a machine learning network forming part of a system of the type shown in FIG. 4.
Figure 5B:
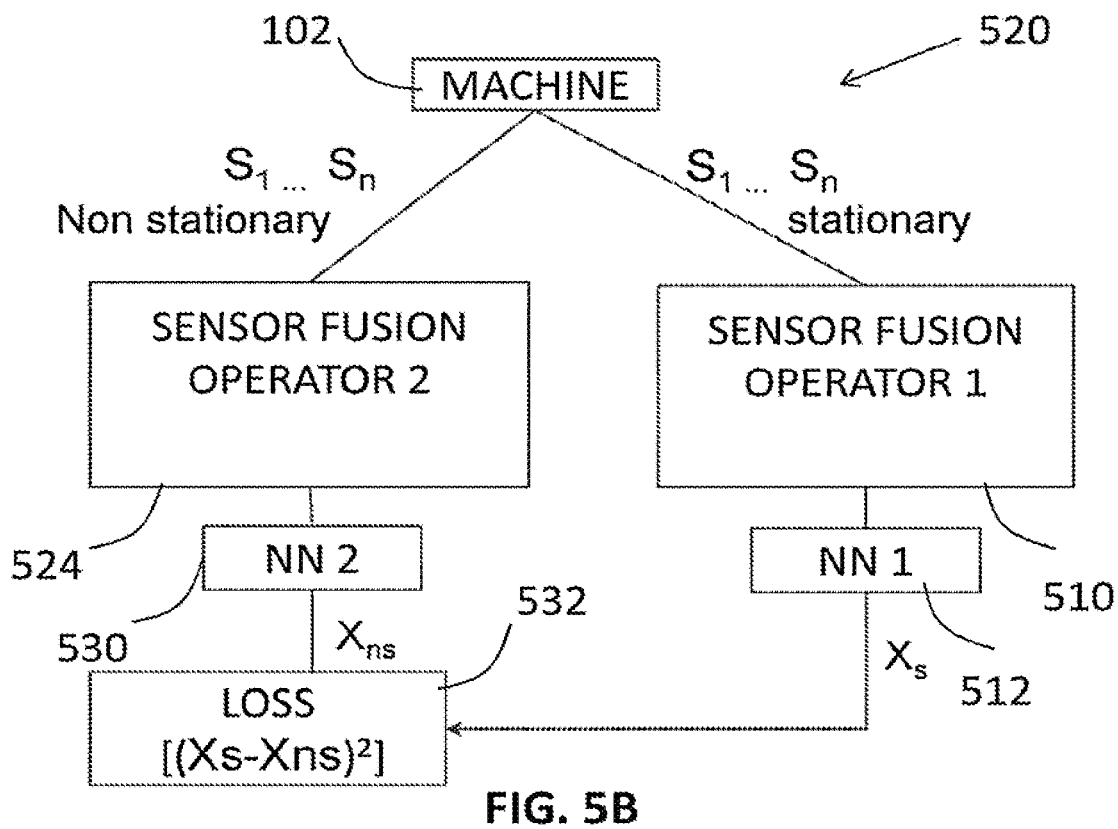
Figure 5C:
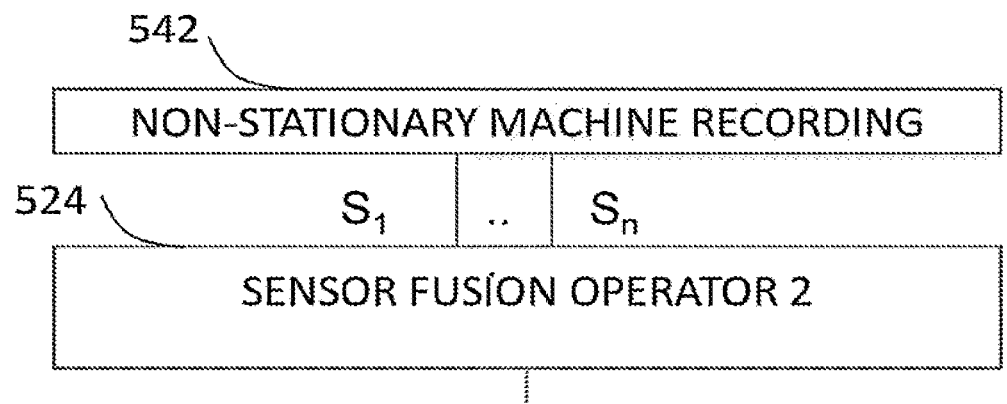

A particularly preferred embodiment of machine learning techniques employed in vibration-magnetic signal fuser 450 is illustrated in FIGS. 5A-5C. It is appreciated, however, that the machine learning techniques employed in vibration-magnetic signal fuser 450 are not limited to those illustrated in FIGS. 5A-5C and may include any suitable machine learning techniques which may be implemented in order to automatically fuse the various non-stationary signals emanating from machine 102 so as to extract therefrom signal features insensitive to the level of stationarity of operation of non-stationary machine 102. The extracted signal features may then be automatically analyzed using conventional signal analysis techniques, which conventional techniques are designed to classify stationary signal features, yet may be accurately applied to the non-stationary signals emanating from machine 102.

Turning now to FIG. 5A, an initial training step 500 in the operation of vibration-magnetic signal fuser 450 is shown. A stationary data set 502 is preferably provided as an input for initial training step 500. Data set 502 preferably includes data from a plurality of sensors $S_1$-$S_n$, which plurality of sensors are here embodied, by way of example, as vibration sensor 110 and magnetic sensor 112. It is appreciated, however, that data set 502 may include data from additional or alternative types of sensors, such as current sensors, electromagnetic sensors, acoustic sensors, pressure sensors, fluid flow sensors and temperature sensors. Data set 502 may include data emanating from machine 102 when operating in a stationary manner and generating stationary signals. Additionally or alternatively, data set 502 may include data emanating from a group of machines sharing a common characteristic with machine 102 although not necessarily being identical thereto and operating in a stationary manner to generate stationary signals. The group of machines sharing a common characteristic from which data set 502 may be acquired may or may not include machine 102.

Plurality of sensors, such as sensors 110 and 112, preferably monitor machine 102 during the same at least one operational time frame of machine 102, such that the respective non-stationary outputs of the sensors represent the same period or periods of machine operation. In one preferred embodiment of the present invention, the plurality of sensors, such as sensors 110 and 112 monitoring machine 102, are sampled mutually synchronously. The sampling may be synchronous within a time window dt of the order of dt≈0.01/f, where f is the frequency of interest, such as the RPM frequency. In another preferred embodiment of the present invention, the plurality of sensors, such as sensors 110 and 112 monitoring machine 102, are sampled mutually synchronously within a time window dt of the order of dt≈0.01/f, where f is the sensor sampling frequency. By way of example, sensors 110 and 112 may operate with a sampling frequency of 20 kHz and thus the time frame dt within which the sensors are synchronously sampled is given by 0.5 μs. It is appreciated that the value of 0.01 is chosen here to limit the error in the synchronous sampling to 1%. However, other values may be selected depending on the required error limits.

Data set 502 is preferably provided to a first sensor fusion operator 510. First sensor fusion operator 510 preferably combines the data from sensors 1-n, here embodied as vibration sensor 110 and magnetic sensor 112, into a combined single data set. In accordance with one embodiment of the present invention, first sensor fusion operator 510 may combine the vibration and magnetic signals into a one-dimensional vector, which vector also includes the logarithmic function of the data, such that the combined single data set output by first sensor fusion operator 510 includes both the original sensor data and the logarithmic functions thereof. It is appreciated, however, that first sensor fusion operator 510 is not limited to including the logarithmic function of the input sensor data but may additionally or alternatively perform other mathematical operations on the data, including, for example, finding the reciprocal of the data or finding the square of the data. Furthermore, first sensor fusion operator 510 may be operative to fuse the data from the plurality of sensors in accordance with other methods as are known in the art, such as adding the vibration and magnetic data and the logarithms thereof and creating a two-dimensional vector, wherein the second dimension represents the number of sensors, or performing a wavelet transform on the vibration and magnetic data.

The combined single data set output by sensor fusion operator 510 is preferably input to a first neural network NN 1, here indicated by reference number 512. NN1 512 is preferably embodied as a multi-layer perception (MLP) network. NN is preferably operative to automatically extract features of the stationary data input thereto, here indicated as $X_s$. It is appreciated that the features extracted by NN1 are preferably based on a fusion of data from sensors 1-n, here embodied as vibration and magnetic sensors 110 and 112. Particularly preferably. NN1 may be operative to extract one or more features from one set of signals, modify a second set of signals based on the extracted features, and then extract one or more features from the second modified set of signals. It is understood that the input of logarithmic data to NN1 facilitates the learning by NN1 of multiplication and division operations of the data from the various sensor types with respect to each other, thus allowing the modification of one signal by features of another signal.

The features extracted by NN1 are preferably provided to a first classifier, classifier 1, indicated by reference number 514. Classifier 1 is preferably operative to classify the features output by NN1 in order to find the condition of the machine by which the analyzed signals were generated. The machine condition output by classifier 1 is preferably provided to a loss calculator 516, whereat a loss function is found. The loss function may be any suitable loss function. The loss function may, by way of example, represent a difference between the classification of the signal feature provided by classifier 1 and the classification of the signal feature provided by a human analysist, such as a cross-entropy loss function.

The loss function if then preferably fed back to NN1 and classifier 1, in order to iteratively further update the weightings within NN1 using back propagation and gradient descent algorithms, so as to train NN1 and classifier 1 to more accurately extract relevant features and classify those features. This iterative process may be continued until the loss function found by loss calculator 516 is acceptably low, meaning that NN1 and classifier 1 are considered to be trained to extract and classifier signal features of stationary signals with an acceptable level of accuracy in comparison to that of a human expert.

By way of example, in the case that the combined single data set output by first sensor fusion operator 510 comprises a one-dimensional vector comprising the signals and the logarithms thereof having a length L, NN1 may comprise a fully connected network including several hidden layers, the exact number of which depends on the signal length L and the desired number of features to be extracted. The number of neurons in the input layer may correspond to the value of L, in the second layer to L/4, in the third layer to L/10 and in the last layer to L/40, assuming that L is much greater than 40. A non-linear activation function may be included between the layers, such as a Relu or sigmoid function, in order to allow the network to learn nom-linear relations between the sensor data points.

Further by way of example, in the case that the combined single data set output by first sensor fusion operator 510 comprises a two dimensional vector of vibration and magnetic data and the logarithms thereof having a total length L>40, then NN1 may be replaced by a convolutional neural network CNN, for example comprising five kernel filters wherein the initial two kernels have a wide dimension of length of L/20 to capture low frequency sensor fusion content and the final three kernels have narrower dimensions of respective sizes of L/80. L/200 and L/400, to capture high frequency sensor fusion content. In order to reduce the dimension of the data set, a pooling layer may be included in the CNN between the convolution layers having maximum pooling of four and two. The activation function is preferably a Relu. Sigmoid or tan H function, in order to allow the CNN to learn non-linear relations between the sensor data. Following the convolution layers, classifier 1 may be provided, preferably comprising a fully connected network having a size equal to the size of the output layer of the CNN, in order to divide the features into classes. Such classes may represent the severity of a specific fault in the operation of the machine or the severity of the general state of health of the machine. For example in the case of multi class classification, a softmax activation function may be included, in the last layer, whereas in the case of a binary classification, a sigmoid function may be used. Batch normalization may be included between layers of the CNN in order to improve the performance of the training of the CNN.

Turning now to FIG. 5B, an additional training step 520 in the operation of vibration-magnetic signal fuser 450, preferably subsequent to training step 500 of FIG. 5A, is shown.

As seen in FIG. 5B, pairs of stationary and non-stationary data emanating from a given machine such as machine 102 are preferably provided. The data pairs preferably include randomly paired stationary data for machine 102, including stationary data from plurality of sensors 1-n, and non-stationary data from machine 102, including non-stationary data from plurality of sensors 1-n. It is appreciated that although the data pairs are randomly paired, it is required that the stationary and non-stationary paired data both correspond to the same state of machine health, which state may be healthy or unhealthy. The pairs are preferably shuffled so as to be mixed, whilst satisfying the requirements that members of each pair correspond to the same machine state of health.

It is appreciated that in order to perform first training step 500 on stationary data and in order to perform second training step 520 on stationary and non-stationary data, it is necessary to distinguish between stationary and non-stationary data. In accordance with a preferred embodiment of the present invention, stationary and non-stationary data may be distinguished between based on stationarity testing. Such testing may be carried out by a machine learning classifier, trained to classify the data as stationary or non-stationary based on data labelling. Alternatively, such testing may be carried out by a signal processing based classifier, operative to analyze the operational state of the machine from which the data emanated. By way of example, such a classifier may be operative to perform a wavelet transform on the magnetic signals in order to ascertain whether the dominant frequency peak is constant or non-constant, thus respectively indicating stationary or non-stationary characteristics of machine operation. Further by way of example, such a classifier may be operative to analyze the time waveform of the magnetic signal with zero crossing algorithms in order to ascertain whether the dominant frequency peak is constant or non-constant, thus respectively indicating stationary or non-stationary characteristics of machine operation.

Data classified as stationary data is preferably provided to first sensor fusion operator 510 and data classified as non-stationary data is preferably provided to a second sensor fusion operator 524. First and second sensor fusion operators 510 and 524 preferably respectively combine the data input thereto from sensors 1-n, here embodied as vibration sensor 110 and magnetic sensor 112, into a combined single data set. Furthermore, sensor fusion operators 510 and 524 preferably respectively calculate the logarithmic function of data from sensors 1-n, such that the combined single data set output by sensor fusion operators 510 and 524 respectively include both the original sensor data and the logarithmic functions thereof. It is appreciated that sensor fusion operators 510 and 524 are not limited to calculating the logarithmic function of the input sensor data but may additionally or alternatively perform other mathematical operations on the data, including, for example, finding the reciprocal of the data or finding the square of the data. Furthermore, first and second sensor fusion operators 510 and 524 may be operative to fuse the data from the plurality of sensors in accordance with other methods as are known in the art, such as adding the vibration and magnetic data and the logarithms thereof and creating a two-dimensional vector, wherein the second dimension represents the number of sensors, or performing a wavelet transform on the vibration and magnetic data.

The combined single data set preferably including logarithmic functions output by first sensor fusion operator 510 based on stationary data is preferably provided to NN1 512. It is understood that NN1 512 is already trained to extract relevant features from the stationary data set output by first sensor fusion operator 510, as a result of the training thereof in first training step 500 shown in FIG. 5A. Features of the stationary data extracted by NN1 are here indicated as $X_s$.

The combined single data set preferably including logarithmic functions output by second sensor fusion operator 524 based on non-stationary data is preferably provided to a second NN, here indicated as NN 2 530. NN2 530 preferably has generally the sane architecture as NN1, but with different weightings within the layers of the NN. NN2 is preferably operative to extract relevant, features from the non-stationary data set output by second sensor fusion operator 524. It is appreciated that the features extracted by NN2 are preferably based on a fusion of non-stationary data from sensors 1-n, here embodied as vibration and magnetic sensors 110 and 112. It is understood that the input of logarithmic data to NN2 facilitates the learning by NN2 of multiplication and division operations of the data from the various sensor types with respect to each other. Features of the non-stationary data set extracted by NN2 are here indicated as $X_{us}$.

In order to train NN2 with respect to NN1, the stationary features $X_s$ as found by NN1 and the non-stationary features $X_{us}$ as found by NN2 are preferably provided to a loss calculator 532, whereat a loss function representing a difference between the stationary and non-stationary features is found. Any suitable loss function may be calculated by loss calculator 532. Preferably, the loss calculated is a MSE loss, calculated in accordance with $(X_s-X_{us})^2$.

The loss function if then preferably fed back to NN2, in order to further update the weightings within NN2 so as to train NN2 to automatically accurately extract features from the non-stationary data set which differ minimally from those features extracted from the stationary data set. This iterative process may be continued until the loss function found by loss calculator 532 is acceptably low, meaning that NN2 is considered to be trained to extract signal features of non-stationary signals with an acceptable level of accuracy in comparison to signal features of stationary signals acquired from the same machine or a similar group of machines.

Turning now to FIG. 5C, an operational step 540 in the operation of vibration-magnetic signal fuser 450, preferably subsequent to training steps 500 and 520 of FIGS. 5A and 5B, is shown.

As seen in FIG. 5C, during operation of machine 102 in a non-stationary manner, non-stationary signals 542 emanating from machine 102 are measured by a plurality of sensors $S_1$-$S_n$, here embodied, by way of example, as vibration sensor 110 and magnetic sensor 112. The non-stationary signals 542 are preferably provided to second sensor fusion operator 524, which provides a combined sensor data set to NN2 530. It is understood that NN2 530 is already trained to extract features from non-stationary data in accordance with second training step 520, which features differ from features of stationary data from the same or similar machines by a minimal loss function. As a result, features extracted by NN2 from the fused non-stationary sensor signals may be provided to classifier 1 514 in order to classify the condition of machine 102 based thereon, due to the commonality between these non-stationary signal features and stationary signal features, based on which classifier 1 was trained in first training step 500. It is appreciated that NN2 is thus preferably operative to extract at least one feature of the first non-stationary output which is insensitive to a level of stationarity of non-stationary operation of machine 102 and thus may be accurately classified by classifier 1, despite classifier 1 having been trained to classify features of stationary signals.

The results of the classification performed by classifier 1 within step 540 may be provided to controller 154, based on which controller 154 may automatically modify an operating parameter of machine 102, initiate or schedule a repair operation on machine 102 or initiate or schedule a maintenance operation on machine 102. Additionally or alternatively, the results of such classification may be presented in a human-sensible form to at least one human expert, based on which the human expert may evaluate the machine state and initiate maintenance, repair or operational parameter changes accordingly. It is appreciated that classifier 1 may be trained in first training step 500 to allow the classification of specific faults in machine 102, such as, by way of example, bearing wear. Additionally or alternatively, classifier 1 may be trained in a non fault-specific manner, to allow classification of the state of machine 102 as healthy or unhealthy, wherein the nature of the anomalous operation of machine 102 is not specified by classifier 1.

It is appreciated that in FIGS. 5A 5C, the initial input signals from plurality of sensors $S_1$-$S_n$ may comprise raw data acquired by the plurality of sensors or may comprise processed data based on the raw data, in which the raw data is transformed before further processing by the networks.

Figure 6:
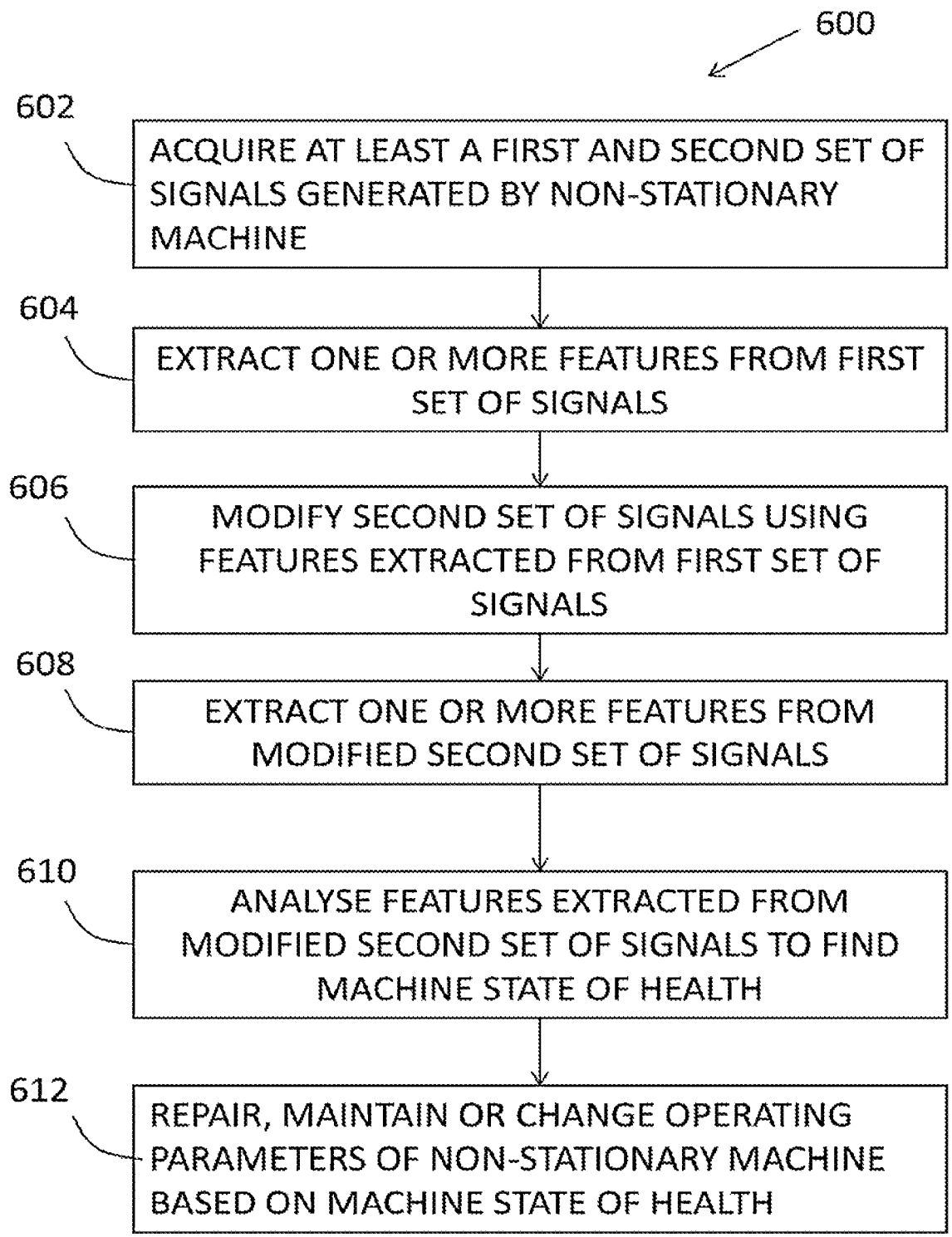
FIG. 6 is a simplified flow chart illustrating steps involved in the extraction of features of signals emanating from a non-stationary machine operating within a system of the type shown in FIG. 1 or FIG. 4.

Reference is now made to FIG. 6, which is a simplified flow chart illustrating steps involved in the extraction of features of signals arising from a non-stationary machine operating within a system of the type shown in FIG. 1 or in FIG. 4.

As seen in FIG. 6, a method 600 for the extraction of features of signals arising from a non-stationary machine may begin at a first step 601 whereat at least a first and a second set of signals are acquired from a non-stationary machine during the operation thereof.

The first and second sets of signals are preferably acquired during the same operational at least one time frame of machine 102, such that the respective non-stationary outputs of the sensors represent the same period or periods of machine operation, in one preferred embodiment of the present invention, the plurality of sensors, are sampled mutually synchronously. The sampling may be synchronous within a time window dt of the order of dt≈0.01/f, where f is the frequency of interest, such as the RPM frequency. In another preferred embodiment of the present invention, the plurality of sensors are sampled mutually synchronously within a time window dr of the order of dt≈0.01/f, where f is the sensor sampling frequency. It is appreciated that the value of 0.01 is chosen here to limit the error in the synchronous sampling to 1%. However, other values may be selected depending on the required error limits.

The first and second sets of signals preferably have non-stationary characteristics due to the non-stationary operation of the machine monitored thereby.

It is appreciated that the first and second set of signals may respectively be different types of signals, such as vibration and magnetic signals. Alternatively, the first and second set of signals may be the same type of signals, such as both magnetic signals or both vibration signals, but acquired by different types of sensors and therefore differing in certain aspects thereof.

As seen at a second step 604, one or more features are preferably extracted from the first set of signals. By way of example, one or mom features may be extracted from a non-stationary magnetic signal output by a magnetic sensor or from a non-stationary vibration signal output by a vibration sensor. By way of example, a magnetic wavelet transform may be applied to a non-stationary magnetic signal in order to derive a binary magnetic wavelet mask containing only frequencies related to the RPM of the non-stationary machine, as described hereinabove with reference to FIG. 1. Further by way of example, a NN may automatically extract one or more features from a non-stationary magnetic signal output by a magnetic sensor or from a non-stationary vibration signal output by a vibration sensor, as described hereinabove with reference to FIGS. 4-5C.

As seen at a third step 606, the second set of signals is preferably modified using the features extracted from the first set of signals at second step 604. The first set of signals is thus used to convert or calibrate the second set of signals, prior to the further extraction of features from the second set of signals. By way of example, the binary magnetic wavelet mask derived at second step 604 may be used to calibrate the vibration signal, by multiplying the binary magnetic wavelet mask by a vibration wavelet based on the vibration signal, in order to filter out all frequencies from the vibration wavelet other than those relating to the RPM frequency of the non-stationary machine. Further by way of example, a NN may automatically modify one type of non-stationary signal based on features extracted from another type of non-stationary signal.

As seen at a fourth step 608, one or more features are then preferably extracted from the second set of signals as modified at third step 606. By way of example, a summation may be performed over the modified vibration wavelet derived at third step 606 in order to extract the vibration amplitude of the RPM frequency. Further by way of example, the NN may automatically extract features of the non-stationary signal modified thereby. As seen at a fifth step 610, the extracted one or more features may be analyzed in order to find the state of health of the non-stationary machine being monitored. It is appreciated that the one or more features extracted by method 600 are preferably representative of the machine health and are insensitive to the level of stationarity of operation of the machine. By way of example, in the case that the signal features are extracted by a NN, the extracted features may be classified and the machine condition hence derived based on using a classifier trained with data acquired from the same or similar machine operating in a stationary rather than non-stationary manner.

As seen at a sixth step 612, a repair or maintenance operation may be performed or scheduled to be performed on the machine or operating parameters of the machine may be changed, based on the state of health of the machine ascertained at fifth step 610. It is appreciated that sixth step 612 may be carried out in an automated manner, by a controller coupled to the machine being monitored. Additionally or alternatively, the state of health of the machine being monitored may be communicate to a human expert in human-sensible form, and the human expert may be involved in directing repair, maintenance or operational changes to the machine being monitored.

Figure 7:
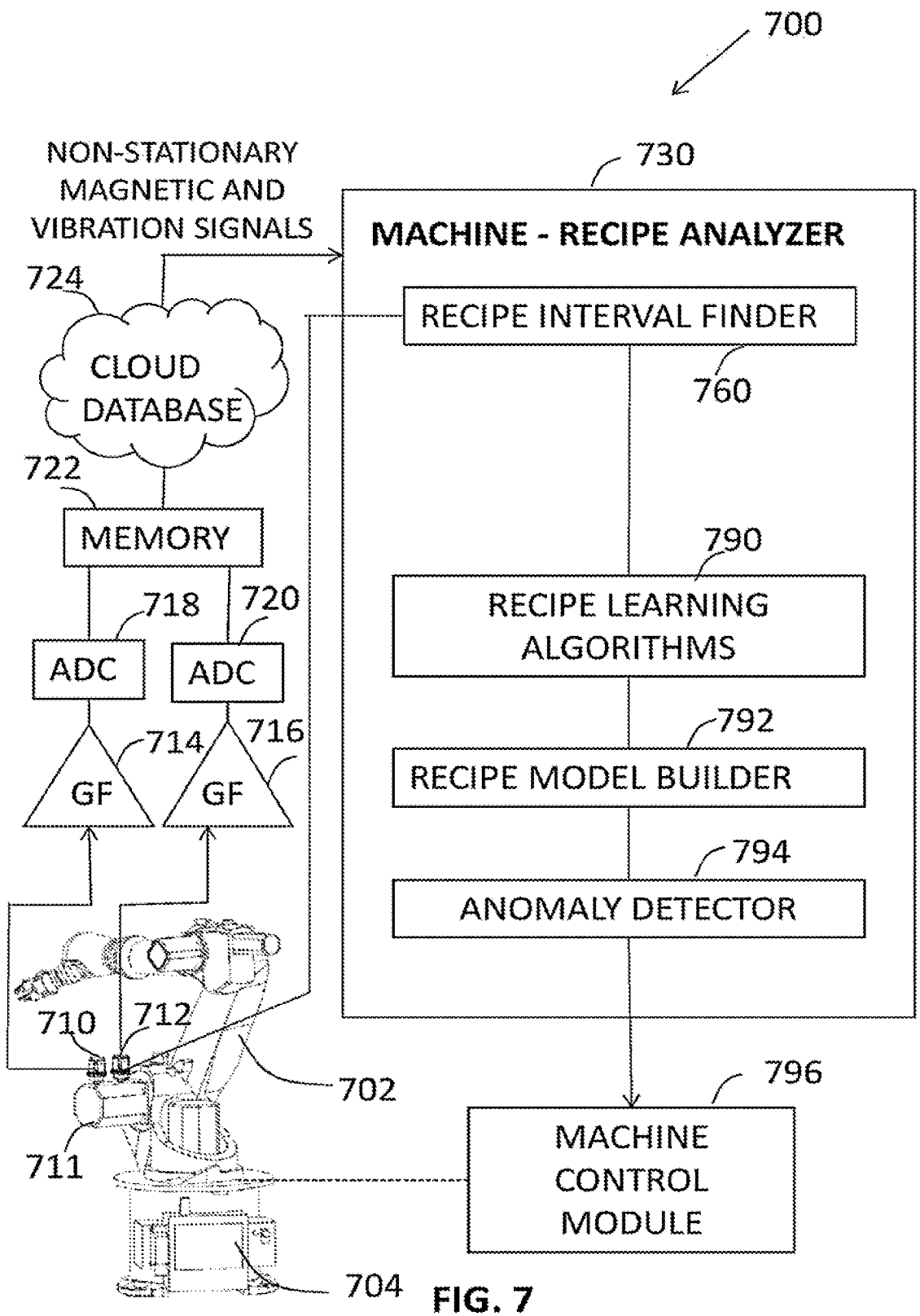
FIG. 7 is a simplified schematic illustration of a system for automated analysis of non-stationary machine performance, constructed and operative in accordance with still another preferred embodiment of the present invention.

Reference is now made to FIG. 7, which is a simplified partially pictorial, partially block-diagram illustration of a system for automated analysis of non-stationary machine performance, constructed and operative in accordance with another preferred embodiment of the present invention.

As seen in FIG. 7, there is provided a system 700 for the monitoring and automated analysis of the performance of a non-stationary machine, here embodied, by way of example only, as a robotic machine 702 or servo motor operating in accordance with a programmable operating regime or recipe embedded in a machine controller 704. Machine 702 operates in a non-stationary manner due to time varying modification by controller 704 of machine parameters such as incoming power and rotation speed.

It is appreciated that conventional machine monitoring and diagnostic systems are poorly suited for the monitoring and analysis of such a non-stationary machine, due to the non-stationary signal characteristics exhibited thereby. In accordance with preferred embodiments of the present invention, novel systems and methods are provided for the monitoring and automated condition analysis of non-stationary process machines operating in accordance with a time varying recipe. Such condition analysis is preferably based on the monitoring of the non-stationary machines by a plurality of sensors, fusing the non-stationary outputs of the sensors over a recipe interval so as to create a fused output and extracting signal features reflecting the condition of the machine operating in accordance with the recipe, based on the fused output.

In certain embodiments of the present invention, it may be advantageous, following the finding of the recipe interval, to adjust the sampling characteristics of the plurality of sensors in accordance with the recipe interval found. Signal features may then be extracted and signal characteristics associated with the machine during the recipe interval automatically learned. Such learning may be used to build a baseline model of machine performance during the recipe interval. Subsequent signal features extracted from signals generated by the machine may then be compared to the baseline model of machine performance, in order to detect anomalies and deviations indicative of changes in the machine state of health. Appropriate corrective measures, such as machine repair, maintenance or operating parameter changes may be taken based on the anomalies found.

As seen in FIG. 7, robot 702 is preferably monitored by a plurality of sensors here embodied, by way of example, as a first vibration sensor 710 measuring vibrations emanating, for example, from a motor 711 driving an arm of robot 702 and a second magnetic sensor 712 measuring magnetic flux emanating from motor 711. It is appreciated that the vibration and magnetic flux signals and emanating from motor 711 of robot 702 and measurable by first and second sensors 710 and 712 are preferably non-stationary signals due to the non-stationary manner of operation of robot 70, irrespective of the state of health of robot 702.

Figure 8:
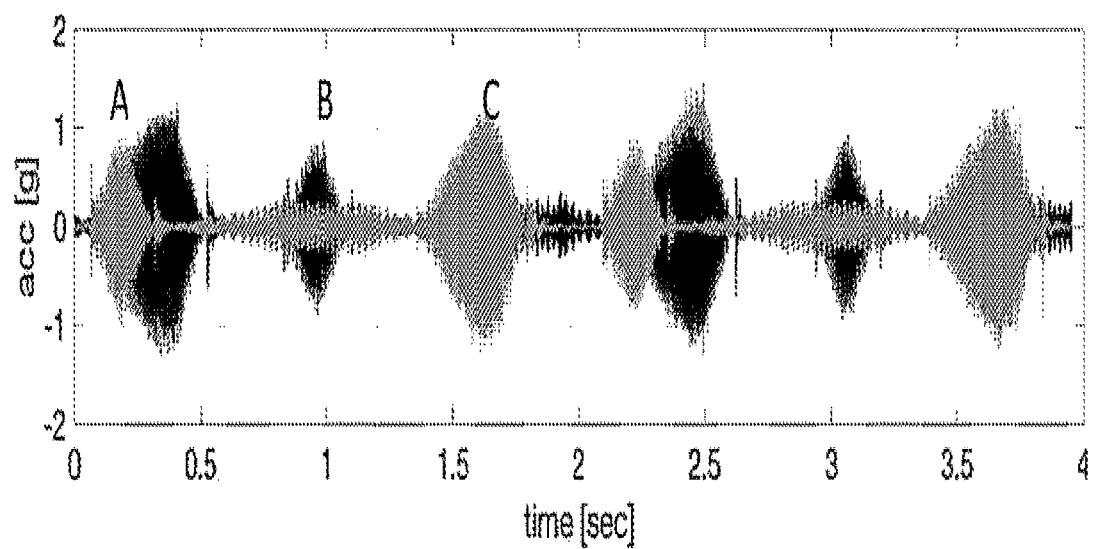
Figure 9:
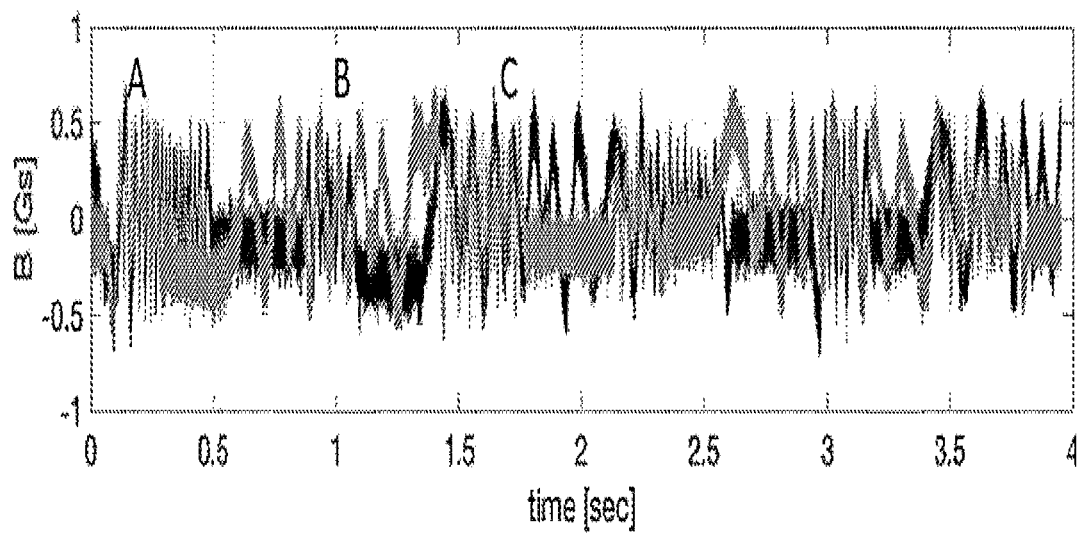

Exemplary data representing vibration and magnetic signals generated by a process machine such as robot 702 as measured by sensors 710 and 712 are shown in FIGS. 8 and 9. FIG. 8 displays data for two vibration waveforms during a four second recording of motor 711 of robot 702 operating during two different time periods. FIG. 9 displays data for two magnetic waveforms acquired synchronously with the two vibration waveforms shown in FIG. 8. As appreciated from consideration of FIGS. 8 and 9, robot 702 is operated in accordance with a recipe characterized by three operating regions respectively indicated as A, B and C in FIGS. 8 and 9, each of the operating regions having associated therewith increased vibration and magnetic signals. These three operating regions A, B and C within the recipe give rise to different signals due to different input parameters, as modified by controller 704 of machine 702.

It is appreciated that vibration and magnetic sensors 710 and 712 are shown by way of example only, and that additional or alternative sensor types may be used to monitor the performance of machine 702, including but not limited to current sensors, electromagnetic sensors, acoustic sensors and temperature sensors. It is further appreciated that the plurality of sensors monitoring machine 702 may include a plurality of sensors measuring the same type of signal, such as a plurality of vibration sensors or a plurality of magnetic sensors, wherein the sensors differ from each other, thus giving rise to slightly different outputs despite measuring the same parameter of machine 702.

It is additionally appreciated that the plurality of sensors by which machine 702 is monitored may be contact or non-contact sensors. In certain embodiments of the present invention, the use of non-contact sensors may be preferable due to the difficulty in securely attaching sensors to moving non-stationary equipment.

Plurality of sensors, such as sensors 710 and 712, preferably monitor machine 702 during the same at least one operational time frame of machine 702, such that the respective non-stationary outputs of the sensors represent the same period or periods of machine operation. In one preferred embodiment of the present invention, the plurality of sensors, such as sensors 710 and 712 monitoring machine 702, are sampled mutually synchronously. The sampling may be synchronous within a time window dt of the order of $dt \approx 0.01/f$, where f is the frequency of interest, such as the RPM frequency. In another preferred embodiment of the present invention, the plurality of sensors, such as sensors 710 and 712 monitoring machine 702, are sampled mutually synchronously within a time window di of the order of $dt \approx 0.01/f$, where f is the sensor sampling frequency. By way of example, sensors 710 and 712 may operate with a sampling frequency of 20 kHz and thus the time frame dt within which the sensors are synchronously sampled is given by 0.5 µs. It is appreciated that the value of 0.01 is chosen here to limit the error in the synchronous sampling to 1%. However, other values may be selected depending on the required error limits. As is detailed hereinbelow, the sensor sampling frequency may be adjusted in accordance with the recipe interval following the finding of the recipe interval.

Preferably, the first non-stationary output provided by vibration sensor 710 and the second non-stationary output provided by magnetic sensor 712 are provided to respect GFs 714 and 716, which in turn provide the respective signals to analogue-to-digital converters (ADC) 718 and 720. The digitized signals output by ADCs 718 and 720 are preferably provided to a memory component 722 such as a CPU and optionally to a cloud database 724. It is understood that the synchronously sampled data acquired by sensors 710 and 712 may be transferred to an entirely cloud based system, to a local hardware system or to a system comprising both local and cloud based elements, depending on the operating specifications of system 700. It is further understood that the specific processing components shown herein, including GIs 714 and 716, ADCs 718 and 720 and CPU 722, are detailed by way of example only and that any suitable signal processing components may be employed in systems of the present invention.

The synchronously sampled first and second non-stationary outputs respectively output by vibration sensor 710 and magnetic sensor 712 are preferably provided to a machine recipe analyzer 730, which machine recipe analyzer 730 may be included in cloud database 724 or may comprise local processing elements.

Preferably, machine recipe analyzer 730 includes a recipe interval finder 760, operative to find the interval of the recipe governing the operation of robotic machine 702. Recipe interval finder 760 may find the recipe interval based on detecting repetitive intervals in the outputs of sensors 710 and 712. Preferably, although not necessarily, recipe interval finder 760 may employ cross-sensor fusion, as described hereinabove with reference to FIGS. 1-6, in order to find repetitive signal features in fused magnetic and vibration signals generated by machine 702.

Figure 10:
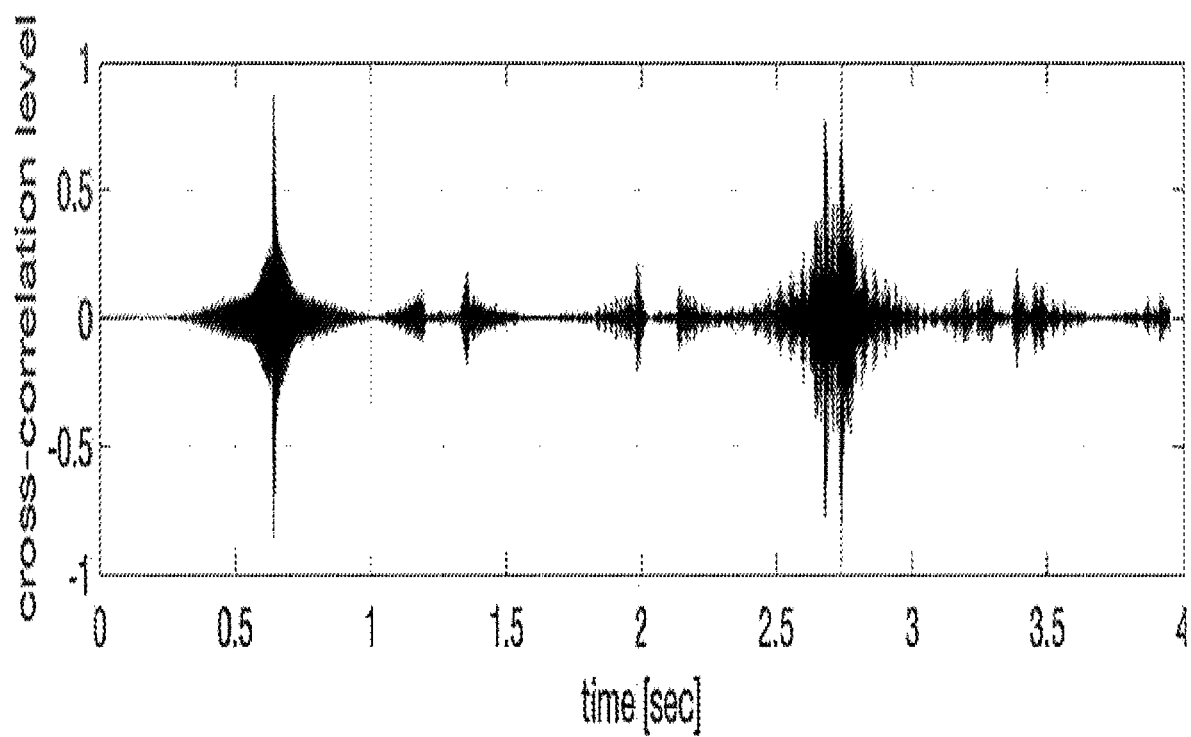

Cross-correlation levels between the two sets of vibration data of FIG. 8, indicating the recipe interval, are shown in FIG. 10. A cross-correlation algorithm may be applied at several time intervals and a grading given based on the correlation magnitude weighted by the rotation speed in accordance with $$\frac{1}{S_{tot}} \int \frac{1}{W(f_{rpm},t)} S_1^*(t) \cdot S_2(t+\tau)dt \quad (2)$$

where $S_i$ represents the sensor data from any type of sensor such as vibration or magnetic, $S_{tot}$ is the sum of the product of the energy magnitude of the two sensors and W is an RPM weighted function.

Recipe interval finder 760 may optionally be operatively provide feedback control to sensors 710 and 712, such that following ascertainment of the recipe interval, recipe interval finder 760 may be automatically operative to reconfigure the sampling parameters of sensors 710 and 712 in accordance with the recipe interval found thereby. By way of example, following the ascertainment of the recipe interval, the sampling duration and/or frequency of one or both of sensors 710 and 712 may be adjusted in order to allow sensors 710 and 712 to monitor robot 702 during the entirety of the recipe interval, during defined periods within the recipe interval or over multiple cycles of the recipe interval.

Following finding of the recipe interval by recipe interval finder 760 and optional appropriate corresponding adjustment of sampling parameters of sensors 710 and 712, data acquired by sensors 710 and 712 over the recipe interval may be processed in order to detect zones or regions of interest within the signals acquired over the recipe interval, as found by recipe interval finder 760. Such nines may be selected based on being particularly representative of machine performance and may, by way of example, correspond to zones including increased vibrations or increased magnetic flux signals.

Zone detection may be carried out based on applying a Hilbert transform to data within the recipe interval and analyzing the envelope function thereof. The Hilbert transform may be applied to data from the individual sensors or to data extracted from cross-sensor processing of data from the individual sensors. Alternatively, zone detection may be carried out based on convolution masking with a Gaussian function, in order to capture the exponential signal rise and decay associated with vibration zones. An example of a vibration signal divided into zones is shown in FIG. 11. As seen in FIG. 11, a dotted line 780 represents the fitting algorithm applied for zone detection and individual zones are delineated by vertical lines 782.

Data acquired by sensors 710 and 712 over the recipe interval is preferably analyzed in order to extract characteristic features thereof and thus learn the characteristics of the machine performing the recipe over the recipe interval. In the case that zone detection is performed signal features may be calculated one a zone by zone basis, per each specific zone, rather than over the entire recipe interval. Zones may be classified based on characteristic features thereof including, by way of example, zone energy, zone duration and moment variation within zones, it is appreciated that the division of the recipe interval into representative zones and finding of signal features per zone rather than over the entire recipe interval is highly advantageous, since feature extraction over the entire recipe interval will typically result in low resolution poorly representative features due to high variation in operating regimes within the recipe interval. However, it is understood that the division of the recipe interval into zones may not be required in certain embodiments of the present invention should variations within the recipe interval be of a small enough scale as to render such zone division unnecessary.

Additionally or alternatively, analysis of the data acquired by sensors 710 and 712 within the recipe interval may be based on other machine learning algorithms. Features extracted from the data may include statistical features such as the probability density function moment, cumulants or entropy of the data; operational features such as speed and incoming power; signature features such as principle waveform components, waveform power spectrum, signal energy and signal integrity features; machine performance features such as machine efficiency, for example based on signal analysis algorithms of the types described in WO/2018/198111; and features associated with environmental features which may be acquired from external sensors, such as environmental temperature acquired from an external temperature sensor which may be compared with machine temperature and machine pressure in the case of machines involving fluid flow.

Signals features associated with the machine 702 performing the recipe, preferably including zone features, may be learned by recipe learning algorithms 790. The automated learning of signal features associated with the recipe may be augmented by the input of external data such as, by way of example, data from controller 704. Controller data may be correlated with data from sensors 710 and 712 in order to provide additional information relating to the recipe according to which machine 702 operates and thus improve the accuracy of the detection of the recipe interval.

Following the finding of the recipe characteristics and features by recipe learning algorithms 790, a model of performance of machine 702 during the execution of the recipe thereby may be built. Such a model may be constructed by a recipe model builder 792 and may constitute a baseline model representing machine performance within a given recipe regime. The model may be stored in a data base, such as cloud database 724. The model may be used as a basis against which subsequent features of signals generated by machine 702 during the execution of the recipe may be compared in order to detect anomalies and deviations. By way of example, anomalies in machine performance may be detected by an anomaly detector 794. Anomalies in recipe characteristics may be due, for example, due to machine degradation. Alternatively, anomalies may be due to malicious intervention in machine operation, for example in the case of a malicious security breach mounted on controller 704 in order to modify the machine recipe. Anomalies detected by anomaly detector 794 may be output and based on these anomalies, the state of health of machine 702 or malicious intervention therewith may be found. Appropriate corrective measures, such as changes in machine operational parameters, cessation of machine operation or repair of machine may then be carried out, either automatically such as by a machine control module 796 or based on human intervention.

The model constructed by recipe model builder 792 may include data from low power sensors coupled to machine 702, operating at a lower power than sensors 710 and 712 but correlated therewith. Such low power sensing may be performed continuously with respect to machine 702, rather than within specific recipe intervals, and may be used to detect real time anomalies in sensor readings from the model of machine performance during execution of the recipe. In the case that such anomalies are found, the lower power sensors may activate the higher power sensors, such as sensors 710 and 712, in order to collect additional data based on which more advanced anomaly detection algorithms may be applied by anomaly detector 794.

Recipe learning algorithms 790, recipe model builder 792 and anomaly detector 794 correspond to one preferred embodiment of machine learning algorithms used to automatically build a model of operation of machine 702 performing a given recipe and compare signals emanating from machine 702 to that model in order to evaluate anomalies in the operation of machine 702.

In accordance with a particularly preferred embodiment of the present invention, recipe learning algorithms 790, recipe model builder 792 and anomaly detector 794 may employ deep learning, and particularly preferably may employ a recurrent NN (RNN), such as a Long Short-Term-Memory (LSTM) network in order to find anomalies in non-stationary signals emanating from machine 702 during the execution of a recipe thereby.

Figure 12A:
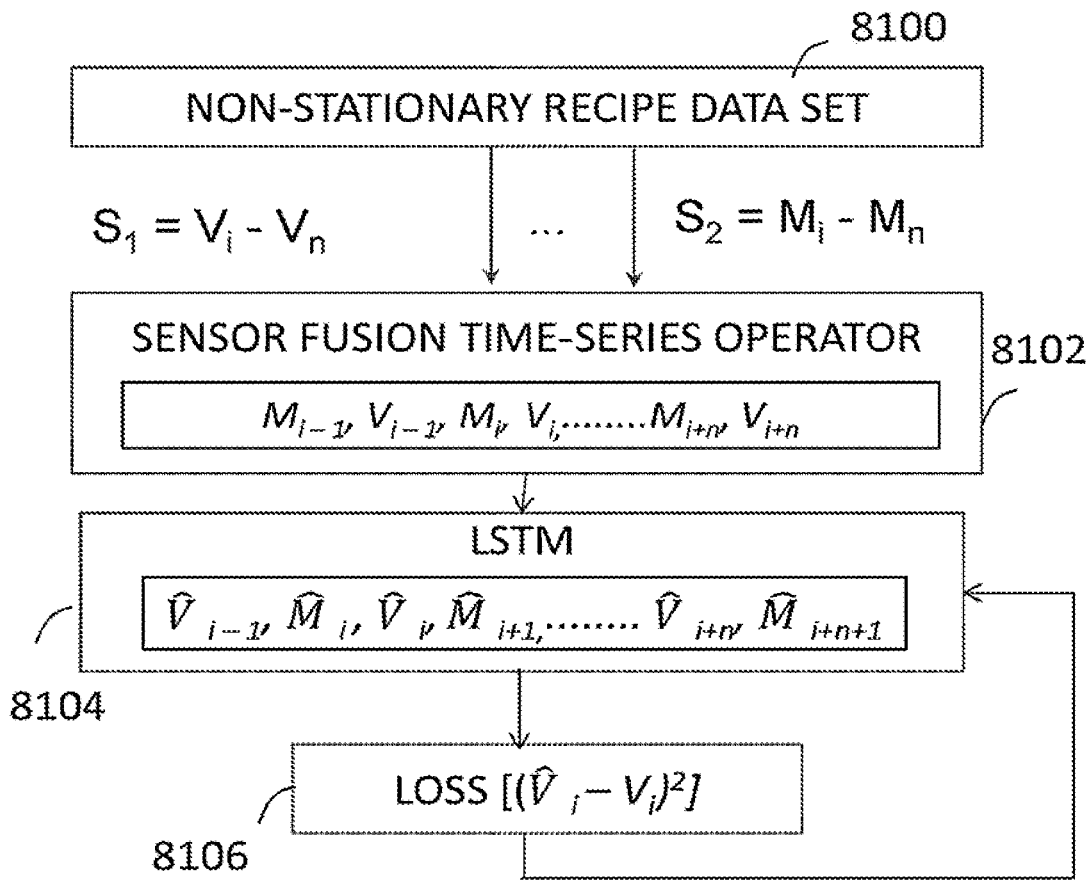
FIGS. 12A, 12B and 12C are simplified charts respectively illustrating steps in the training and operation of a machine learning network forming part of a system of the type shown in FIG. 7.
Figure 12B:
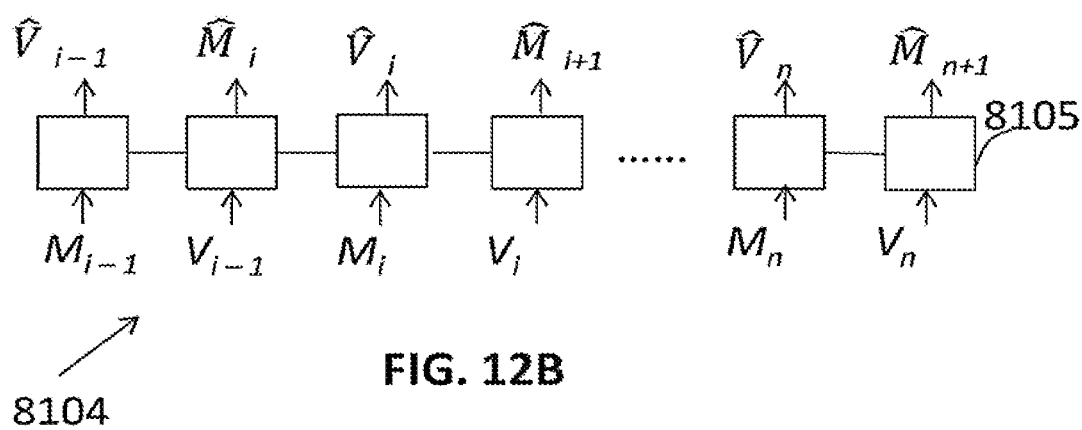
Figure 12C:
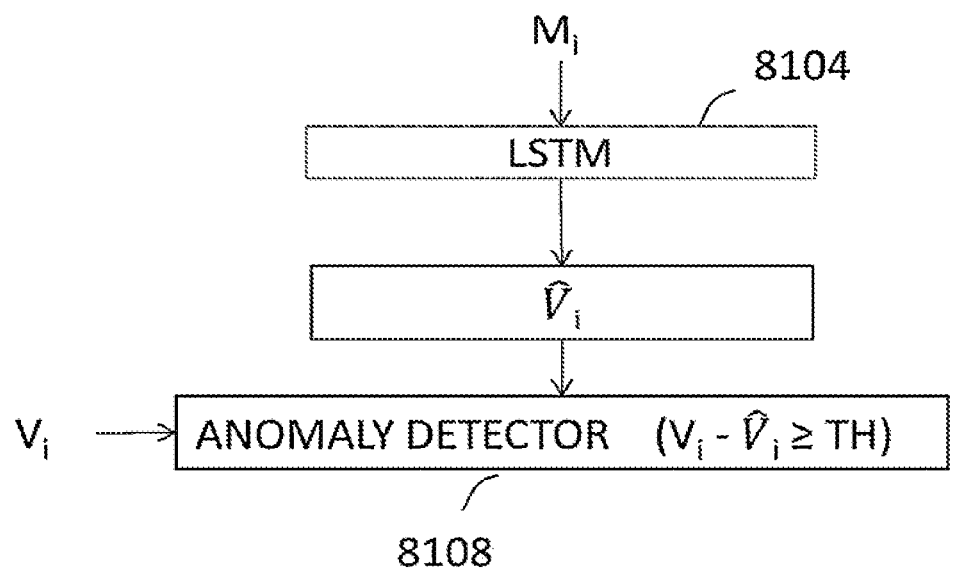

A particularly preferred embodiment of a possible implementation of an LSTM network employable within machine recipe analyzer 730 is shown in FIGS. 12A, 12B and 12C. Turning now to FIG. 12A, a non-stationary recipe data set 8100, such as that generated by machine 702, is seen to comprise a plurality of signals, here embodied as a first signal set $S_1$ comprising vibration signals over time and a second signal set $S_2$ comprising magnetic signals over time. It is appreciated that the time series of vibration and magnetic signals preferably spans an entire recipe interval and may span multiple recipe intervals, as preferably found by recipe interval finder 760. It is further appreciated that the first and second signal sets $S_1$ and $S_2$ may comprise raw sensor data, but more preferably comprise features extracted from the raw data, such as the line frequency or RPM or zone features. For example, first set of signals $S_1$ may comprise the vibration levels of motor 711 and second set of signals $S_2$ may comprise the current line frequencies of the motor, preferably although not necessarily over zones. It is appreciated that whereas vibration levels of motor 711 represent a mechanical state of motor 711, the line frequencies of the motor 711 based on the magnetic signal directly correlate to the motor speed and thus an operational state of the motor.

Signal sets $S_1$ and $S_2$ are preferably provided to a sensor-fusion time-series operator 8102. Sensor-fusion time-series operator 8102 preferably fuses the different types of signals into a single combined signal comprising alternating ones of the signal types arranged in accordance with time. Thus, a magnetic signal $M_{i-1}$ is interweaved with a corresponding synchronous vibration signal $V_{i-1}$ followed by a magnetic signal $M_i$ interweaved with a corresponding synchronous vibration signal $V_i$ and so forth. In the case that signals $S_1$ and $S_2$ respectively correspond to signals representing the mechanical and operational state of the machine, sensor-fusion time-series operator 8102 is operative to fuse these signals.

The interwoven data set output by sensor-fusion time-series operator 8102, which may comprise interwoven data representing machine mechanical state and machine operational state, are preferably provided to an LSTM network 8104. One possible mode of operation of LSTM network 8104 may be best understood with reference to FIG. 12B, showing a schematic representation of LSTM network 8104. As seen in FIG. 12B. LSTM network 8104 receives the interwoven magnetic and vibration signals. At each neuron 8105, the LSTM network predicts the corresponding shifted signal, such that each LSTM neuron is operative to predict the adjacent next data point in the fused time series.

The predicted signal value is then compared to the actual measured value of that signal at a loss function module 8106. Loss function module 8106 is preferably operative to compare the predicted signal value to the actual corresponding measured signal value and iteratively update weights of the LSTM network 8104 in order to minimize the difference between predicted and actual values. The LSTM network 8104 is iteratively trained using back propagation and gradient descent algorithms on the loss function, which loss function represents the difference between the time series predicted by the LSTM network 804 and the true time series. Loss function module 8106 may find, by way of example, an MSE loss.

In accordance with another preferred embodiment of the present invention, the LSTM network 8104 may be an LSTM autoencoder operative to encode the interwoven data set and output signal features to loss function module 8105. Signal features output by LSTM network 8104 are preferably based on the fusing of the input signals, in this case embodied as the magnetic and vibration signals, and the extraction of features based thereon. Loss function module 8106 is preferably operative to compare the decoded signal features output by LSTM network 8104 to the input interwoven data set. The difference between the decoded signal features and the interwoven input data set is then fed back to the LSTM network 8104 and the weights of the encoder iteratively adjusted with hack propagation and gradient descent algorithms, until the loss function is acceptably small and the LSTM network 8104 is considered to be trained to encode the interwoven data set to an acceptable level of accuracy.

Turning now to FIG. 12C, following the training of the LSTM network 8104 as shown in FIGS. 12A and 12B, a magnetic signal $M_i$, generated by machine 702 during the operation thereof within a recipe interval may be provided to the trained LSTM network 8104. LSTM network 8104 is preferably operative to forecast a corresponding vibration signal $\hat{V}_i$ corresponding to the magnetic signal input, based on the learning of the correspondence between the vibration and magnetic signals in accordance with the process shown in FIGS. 12A and 12B.

The forecasted vibration signal $\hat{V}_i$ may be compared to an actual measured vibration signal $V_i$ synchronously measured with the magnetic signal $M_i$. By way of example, the actual and forecasted vibration signals may be compared by an anomaly detector 8108, which anomaly detector 8108 may be a particularly preferred embodiment of anomaly detector 794, in the case that the forecasted signal differs from the actual measured signal by more than a given threshold difference, the measured signal is considered to be anomalous and indicate an unhealthy state of operation of machine 702.

It is appreciated that the systems and methods described herein for the conditional monitoring of a process machine operating in accordance with a given recipe are not limited to the case of a single machine. Rather, the present invention may be implemented with respect to a plurality of machines contributing to a common process. Such a process may be a parallel recipe process, in which multiple machines share the same operational mode at the same point in time, or a series recipe process, in which machines operate in series and the output of one machine forms the input of another in a serial manner.

In the case of a multiplicity of machines contributing to a common process, signals are preferably synchronously acquired by a plurality of sensors coupled to each of a multiplicity of machines. Preferably, recipe features are extracted as described hereinabove in the case of a single machine 702, including recipe interval, recipe zones and recipe zone characteristics, and a recipe baseline model constructed but across all or some of the machines carrying out the process rather than for an individual machine.

In the case of multiple machines, cross-correlation in order to establish a recipe interval may generally be carried out as described hereinabove for the case of a single machine, but for the plurality of sensor across the multiplicity of machines and more specifically for sensors of a given type correspondingly coupled to multiple machines, in accordance with $$\sum_{i,j} \frac{1}{S_{tot}^n} \int \frac{1}{W_i(f_{rpm},t)} S_i^{n*}(t) \cdot S_j^n(t+\tau) dt \qquad (3)$$

where n represents the sensor type for any type of sensor such as vibration or magnetic, i represents the machine index and j runs from i+1 to $i_n$. Other parameters are as described hereinabove with reference to equation (2).

It is appreciated that such a process model for multiple machines may be in addition to a single baseline model built for each machine, such as robot 702, within the process. This enhances the accuracy by which anomalies in machine performance may be identified, since multiple machine process anomaly detection may be used to augment individual machine anomaly detection.

Sensors of the same or different types respectively coupled to different machines of the multiplicity of machines may be correlated. Such correlation may be used to find the type of process being carried out by the machines and the recipe interval thereof, in order to appropriately configure sensor sampling parameters, as described hereinabove.

In the case that an LSTM network is employed within machine recipe analyzer 730 for the analysis of the operation of multiple machines jointly carrying out a process, signals emanating from the machines may be combined into, by way of example, a total magnetic vector comprising magnetic signals from all of the multiple machines and a total vibration vector comprising vibration signals from all of the multiple machines, which vibration signals are synchronously acquired with respect to the magnetic signals. The vibration vector may then be interweaved with the magnetic vector by sensor-fusion time-series operator 8102, so as to allow LSTM network 8104 to learn the features of signals of the group of machines performing a given recipe and hence detect deviations therefrom, as described hereinabove. It is appreciated that additionally or alternatively, signals from multiple machines jointly performing a process may be averaged or otherwise combined and then fused by sensor-fusion time-series operator 8102 and provided to LSTM network 8104.

Figure 13:
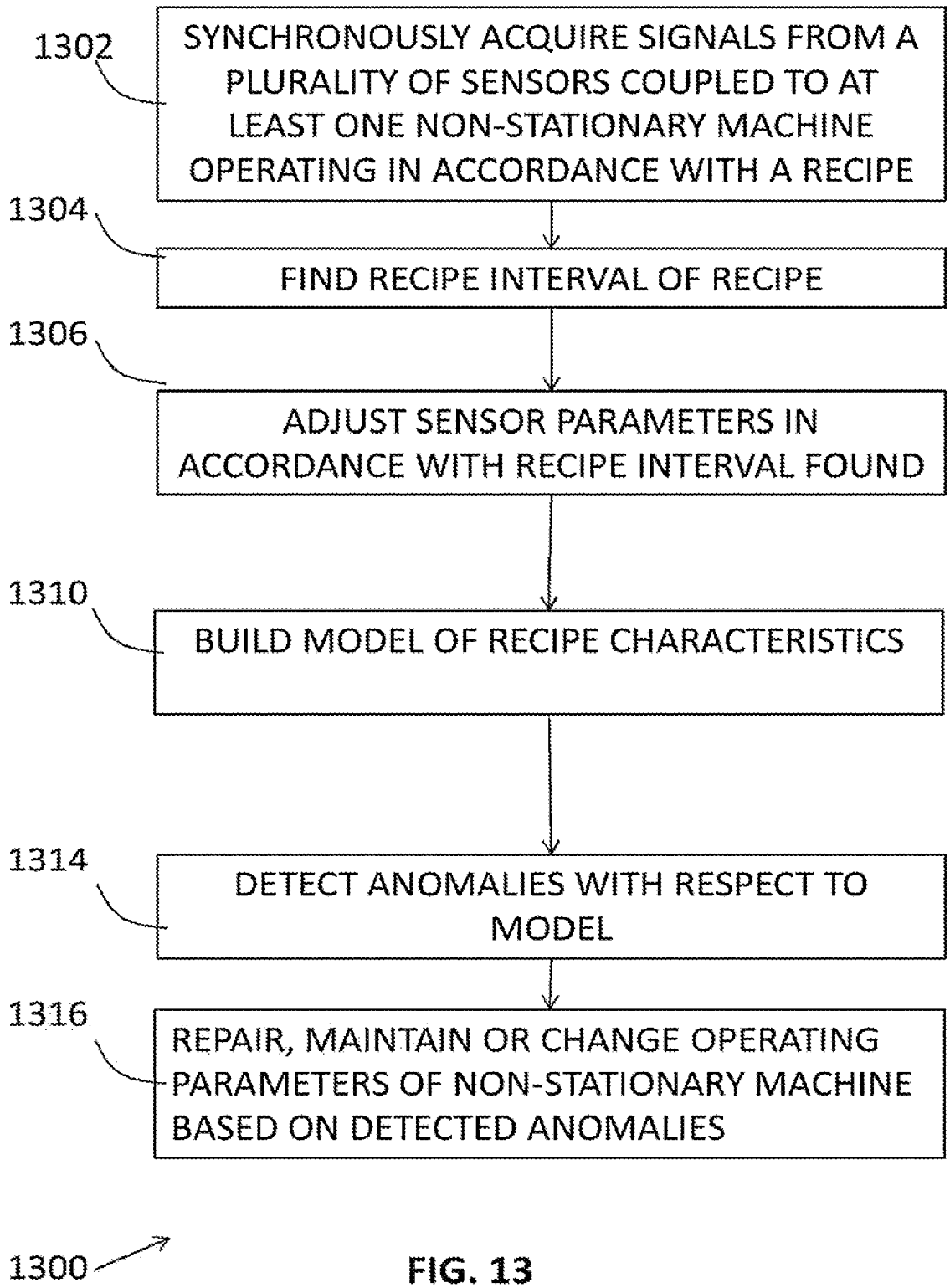
FIG. 13 is a simplified flow chart combinedly illustrating steps involved in the analysis of features of signals arising from a non-stationary machine operating in a system of the type shown in FIG. 7.

Reference is now made to FIG. 13, which is a simplified flow chart illustrating steps involved in the extraction of features of signals arising from a non-stationary machine operating in a system of the type shown in FIG. 7.

As seen in FIG. 13, a method 1300 for the extraction of features of signals arising from a non-stationary machine carrying out a process in accordance with a recipe may begin at a first step 1302, wherein signals are synchronously acquired from a plurality of sensors coupled to at least one non-stationary machine operating in accordance with a recipe. In accordance with one preferred embodiment of the present invention, the plurality of sensors may be coupled to a single non-stationary machine executing a recipe embedded in a controller thereof. In accordance with another embodiment of the present invention, the at least one non-stationary machine may comprise a group of non-stationary machines contributing to a common process, in either a serial or parallel manner and the plurality of sensors may comprise a plurality of sensors coupled to each machine of the group of non-stationary machines.

As seen at a second step 1304, a recipe interval of the recipe being executed by the machine or group of machines is preferably found. As seen at a third step 1306, parameters of the plurality of sensors may be adjusted based on the recipe interval found at second step 1304. By way of example, the sensor sampling frequency or sampling duration may be adjusted so as to allow the sensors to sample the machine or group of machines throughout the entirety of the recipe, at given time points therewithin or over multiple cycles of the recipe.

As seen at a fourth step 1310, a baseline model of the machine performance during execution of the recipe may be built based on the recipe characteristics found, it is appreciated that such a baseline model may be built for an individual machine performing a process in accordance with a recipe, for a group of machines contributing to a common process in accordance with a recipe, or for both.

In accordance with one preferred embodiment of the present invention, building of the model of machine performance may include fusing data from the multiple sensors in an interwoven arrangement of the data time points for the different sensors and providing the interwoven data set to an LSTM network, for learning the relationship between the data points.

As seen at a fifth step 1314, following the creation of a model of the machine performance during execution of the recipe, subsequent machine signal characteristics measured during performance of the recipe by the machine or group of machines may be compared to the baseline model in order to detect anomalies with respect thereto. Such anomalies may be indicative of the state of health of the machine or of the security status of the machine.

In the case that an LSTM network is employed at fourth step 1310 in order to learn the recipe characteristics, fifth step 1314 may involve prediction by the LSTM network of a signal from one type of sensor at one point in time expected to correspond to a measured signal acquired from a different type of sensor at substantially the same point in time. The predicted signal is then compared to an actual measured signal and in the case of deviation between the signals, an anomaly identified.

As seen at an sixth step 1316, in the case that anomalies in machine performance are detected, actions may be performed with respect to the machine or group of machines, including repair or maintenance activities and changes in machine operating parameters including cessation of operation of the machine.

It is appreciated that method 1300 is preferably automated, such that a model of machine performance may be automatically created and anomalies in machine characteristics with respect thereto may be automatically detected, notwithstanding the non-stationary nature of operation of the machine or group of machines being monitored.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. A method for operating non-stationarily operating machinery, comprising:
   acquiring at least a first non-stationary signal generated by at least one machine operating in a non-stationary manner during at least one operational time frame;
   acquiring at least a second non-stationary signal different from said first non-stationary signal and generated by said at least one machine during said at least one operational time frame;
   applying a wavelet transform to both of said at least first and second different non-stationary signals;
   generating a mask of said wavelet transform of one of said first and second non-stationary signals;
   multiplying said mask of said wavelet transform of said one of said first and second non-stationary signals by said wavelet transform of the other one of said first and second non-stationary signals;
   extracting at least one feature of at least one of said first and second non-stationary signals based on said multiplying;
   analyzing said at least one feature to ascertain a condition of said at least one machine; and
   performing at least one of a repair operation, maintenance operation and modification of operating parameters of said at least one machine based on said condition.

2. A method according to claim 1, wherein said first non-stationary signal is of a same type as said second non-stationary signal.

3. A method according to claim 1, wherein said first non-stationary signal is of a different type to said second non-stationary signal.

4. A method according to claim 1, wherein said mask comprises a binary wavelet matrix.

5. A method according to claim 1, wherein said multiplying said wavelet transform of one of said first and second non-stationary signals by a mask of said wavelet transform of the other one of said first and second non-stationary signals comprises multiplying said wavelet transform of said one of said first and second non-stationary signals by an inverse of said mask of said wavelet transform of said other one of said first and second non-stationary signals.

6. A method according to claim 1, wherein said extracting comprises summing said multiplied wavelet transforms.

7. A method according to claim 6, wherein said extracting comprises extracting said at least one feature directly from said multiplied wavelet transforms.

8. A method according to claim 1, wherein said performing is automatically implemented by a controller of said at least one machine.

9. A method according to claim 1, and also comprising tracking, by feature tracking algorithms, said at least one feature, over time.

10. A method according to claim 1, wherein said ascertaining a condition comprising ascertaining a condition of said at least one machine relating to at least one of machine performance and machine efficiency.

11. A system for operating non-stationarily operating machinery, comprising:
   at least a first sensor operative to acquire at least a first non-stationary signal generated by at least one machine operating in a non-stationary manner during at least one operational time frame;
   at least a second sensor operative to acquire at least a second non-stationary signal different from said first non-stationary signal and generated by said at least one machine during said at least one operational time frame;
   a signal processor operative to:
      apply a wavelet transform to both of said at least first and second different non-stationary signals;
      generate a mask of said wavelet transform of one of said first and second non-stationary signals;
      multiply said mask of said wavelet transform of said one of said first and second non-stationary signals by said wavelet transform of the other one of said first and second non-stationary signals;
      extract at least one feature of at least one of said first and second non-stationary signals based on said multiplied wavelet transforms; and
      analyze said at least one feature to ascertain a condition of said at least one machine, and
   a machine control module operative to perform at least one of a repair operation, maintenance operation and modification of operating parameters of said at least one machine based on said condition.

12. A system according to claim 11, wherein said first sensor is of a same type as said second sensor.

13. A system according to claim 11, wherein said first sensor is of a different type to said second sensor.

14. A system according to claim 11, wherein said mask comprises a binary wavelet matrix.

15. A system according to claim 11, wherein said signal processor being operative to multiply said wavelet transform of one of said first and second non-stationary signals by a mask of said wavelet transform of the other one of said first and second non-stationary signals comprises multiplication of said wavelet transform of said one of said first and second non-stationary signals by an inverse of said mask of said wavelet transform of said other one of said first and second non-stationary signals.

16. A system according to claim 11, wherein said signal processor being operative to extract at least one feature comprises summation of said multiplied wavelet transforms.

17. A system according to claim 16, wherein said signal processor is operative to extract said at least one feature directly from said multiplied wavelet transforms.

18. A system according to claim 11, wherein said machine control module is automatically operative to perform said at least one of a repair operation, maintenance operation and modification of operating parameters of said at least one machine based on said condition.

19. A system according to claim 11, and also comprising feature tracking algorithms, operative to automatically track said at least one feature extracted by said signal processor over time.

20. A system according to claim 11, wherein said signal processor being operative to ascertain a condition of said machine comprises said signal processor being operative to ascertain a condition of said at least one machine relating to at least one of machine performance and machine efficiency.

* * * * *